(12) United States Patent
Erickson et al.

(10) Patent No.: US 11,498,269 B2
(45) Date of Patent: Nov. 15, 2022

(54) POST-PRINT PROCESSING OF THREE DIMENSIONAL (3D) PRINTED OBJECTS

(71) Applicant: HEWLETT-PACKARD DEVELOPMENT COMPANY, L.P., Spring, TX (US)

(72) Inventors: Kristopher J. Erickson, Palo Alto, CA (US); Anthony William McLennan, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,001

(22) PCT Filed: Apr. 30, 2018

(86) PCT No.: PCT/US2018/030208
§ 371 (c)(1),
(2) Date: Oct. 17, 2019

(87) PCT Pub. No.: WO2019/212485
PCT Pub. Date: Nov. 7, 2019

(65) Prior Publication Data
US 2021/0323227 A1    Oct. 21, 2021

(51) Int. Cl.
*B29C 64/188* (2017.01)
*B33Y 30/00* (2015.01)
(Continued)

(52) U.S. Cl.
CPC .......... *B29C 64/188* (2017.08); *B29C 64/165* (2017.08); *B29C 64/268* (2017.08);
(Continued)

(58) Field of Classification Search
CPC ... B29C 64/188; B29C 64/165; B29C 64/268; B33Y 30/00; B33Y 40/20; B29K 2995/0073
See application file for complete search history.

(56) References Cited

U.S. PATENT DOCUMENTS 10,766,190 B2 *  9/2020  Weaver ................ B33Y 30/00
10,960,493 B2 *  3/2021  Hyatt ................... B23K 26/342
(Continued)

FOREIGN PATENT DOCUMENTS

EP       2875932 A1      5/2015
WO    WO2015108546 A2   7/2015
(Continued)

OTHER PUBLICATIONS

Vaithilingam, Jayasheelan, et al., Applied Materials & Interfaces, "Combined Inkjet Printing and Infrared Sintering of Silver Nanoparticles Using a Swathe-by-Swathe and Layer-by-Layer Approach for 3-Dimensional Structures", pp. 6560-6570, 2017.

*Primary Examiner* — Nahida Sultana
(74) *Attorney, Agent, or Firm* — Hanley Flight & Zimmerman LLC

(57) ABSTRACT

Example post-print processing of three dimensional (3D) printed objects are disclosed. An example system includes an energy source to apply energy to a selected portion of an outer surface of a 3D printed object. The energy provided by the energy source is to cause a polymer of the selected portion to melt and reflow. The selected portion and a non-selected portion of the outer surface to form a pattern on the outer surface of the 3D printed object. A controller to direct the energy of the energy source to the selected portion of the outer surface.

20 Claims, 12 Drawing Sheets

(51) Int. Cl.
*B29C 64/268* (2017.01)
*B29C 64/165* (2017.01)
*B33Y 40/20* (2020.01)

(52) U.S. Cl.
CPC ............... *B33Y 30/00* (2014.12); *B33Y 40/20* (2020.01); *B29K 2995/0073* (2013.01)

(56) References Cited

U.S. PATENT DOCUMENTS

| | | | |
|---|---|---|---|
| 2010/0072181 A1* | 3/2010 | Maschera | B23K 26/0604 219/121.68 |
| 2014/0170012 A1* | 6/2014 | Delisle | B33Y 10/00 419/6 |
| 2015/0060422 A1* | 3/2015 | Liebl | B23K 26/08 219/121.78 |
| 2016/0067927 A1 | 3/2016 | Voris et al. | |
| 2016/0198576 A1 | 7/2016 | Lewis et al. | |
| 2016/0307083 A1 | 10/2016 | Kumar et al. | |
| 2017/0087639 A1 | 3/2017 | Folgar et al. | |
| 2017/0133252 A1 | 5/2017 | Fung et al. | |
| 2018/0050486 A1 | 2/2018 | Talgorn et al. | |
| 2021/0016509 A1* | 1/2021 | Vora | B29C 64/393 |

FOREIGN PATENT DOCUMENTS

| | | |
|---|---|---|
| WO | WO2017015159 A1 | 1/2017 |
| WO | WO2017192140 A1 | 11/2017 |
| WO | WO2018017084 A1 | 1/2018 |

\* cited by examiner

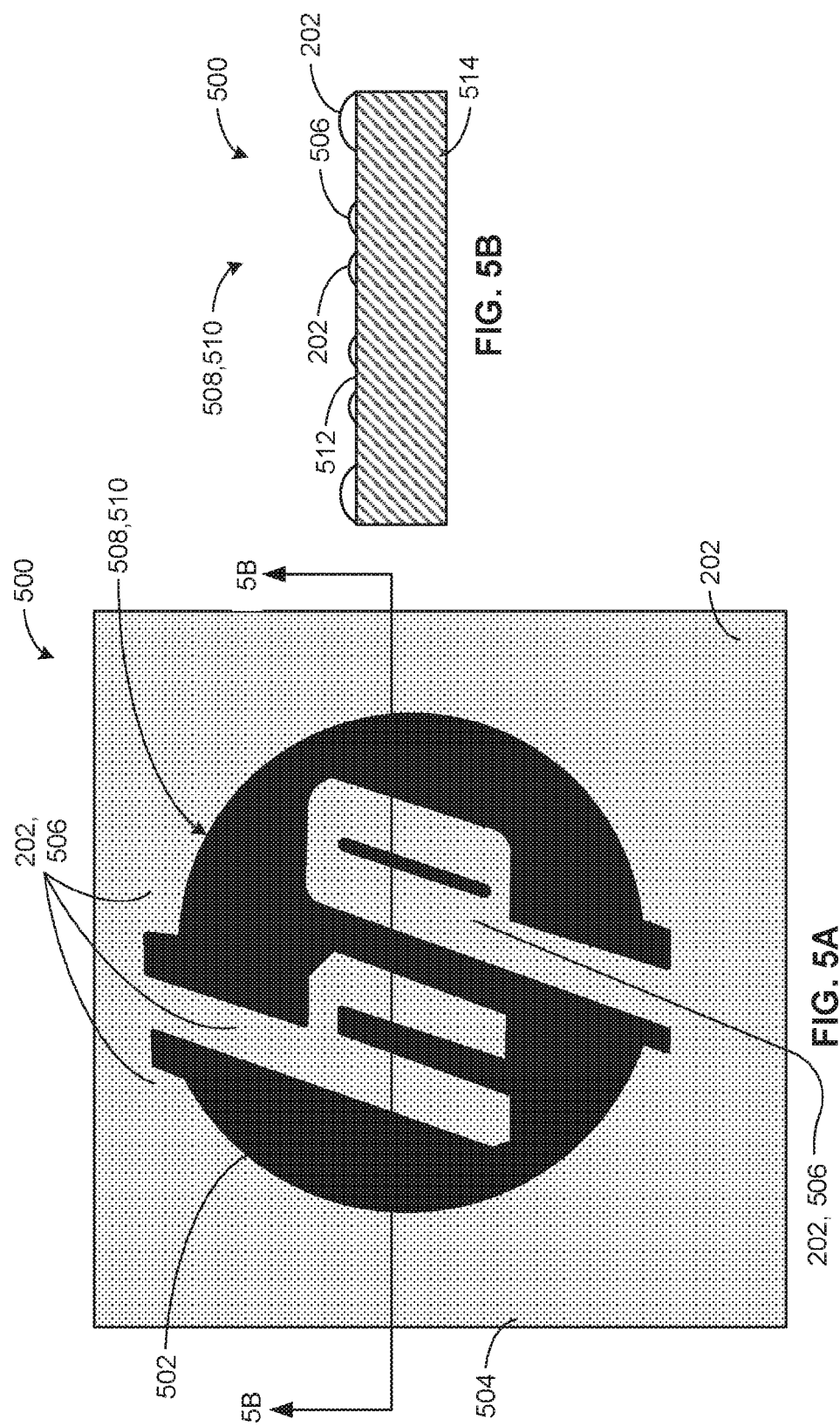

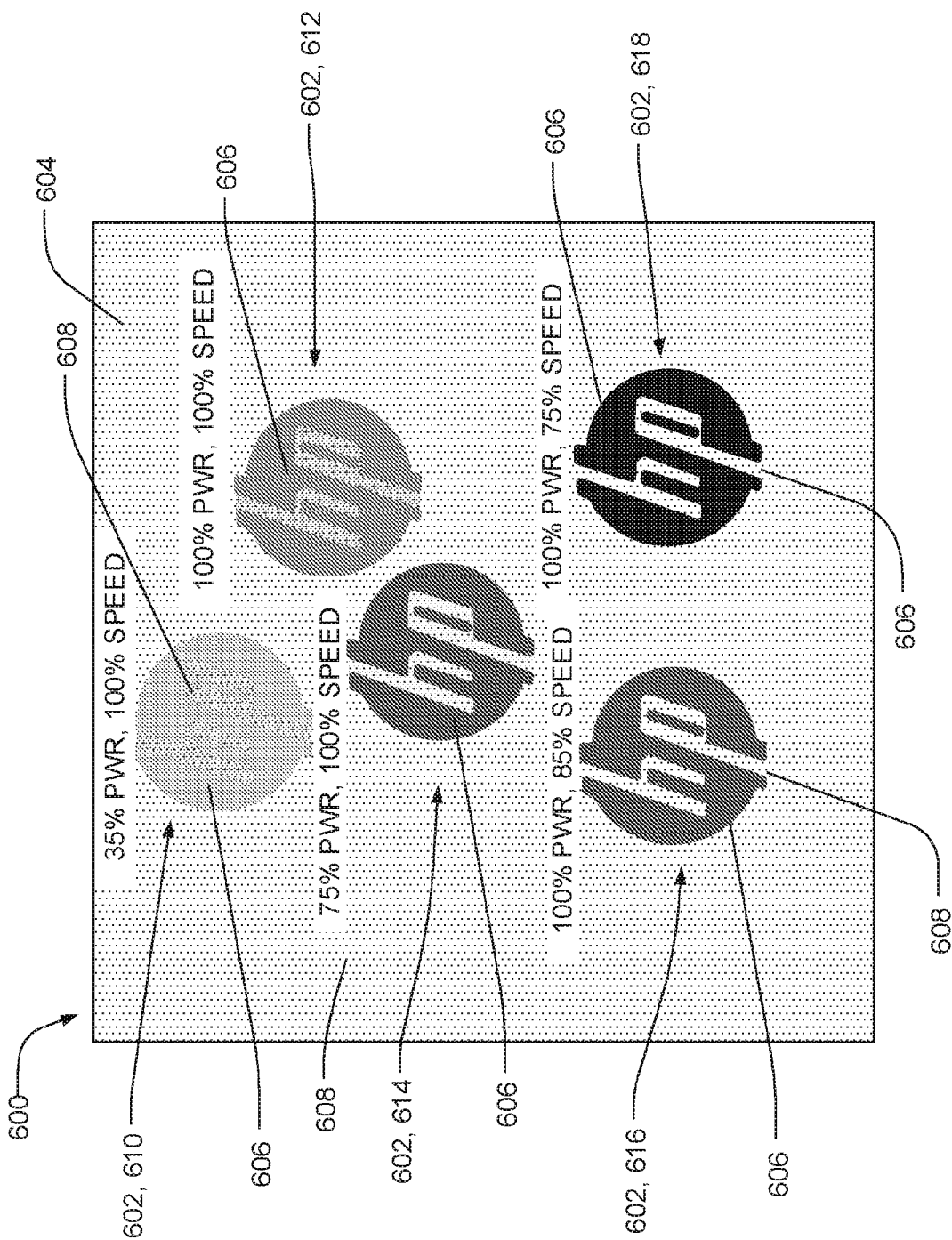

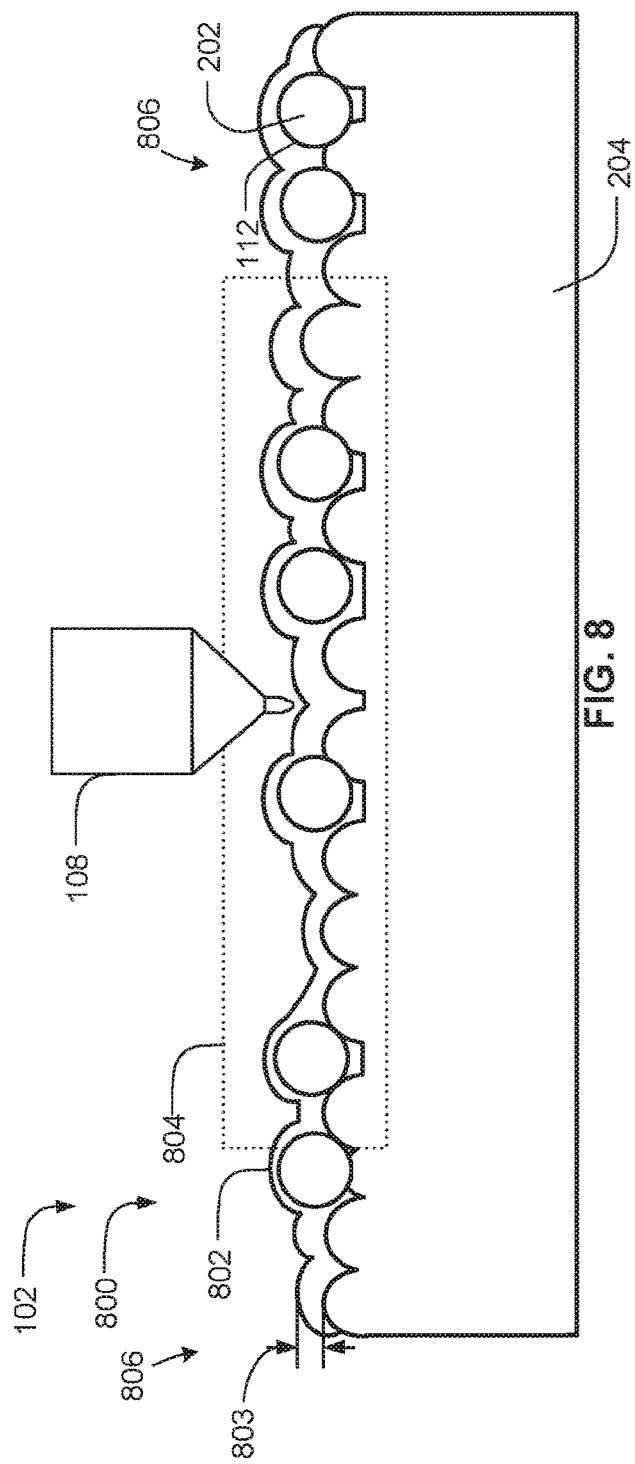
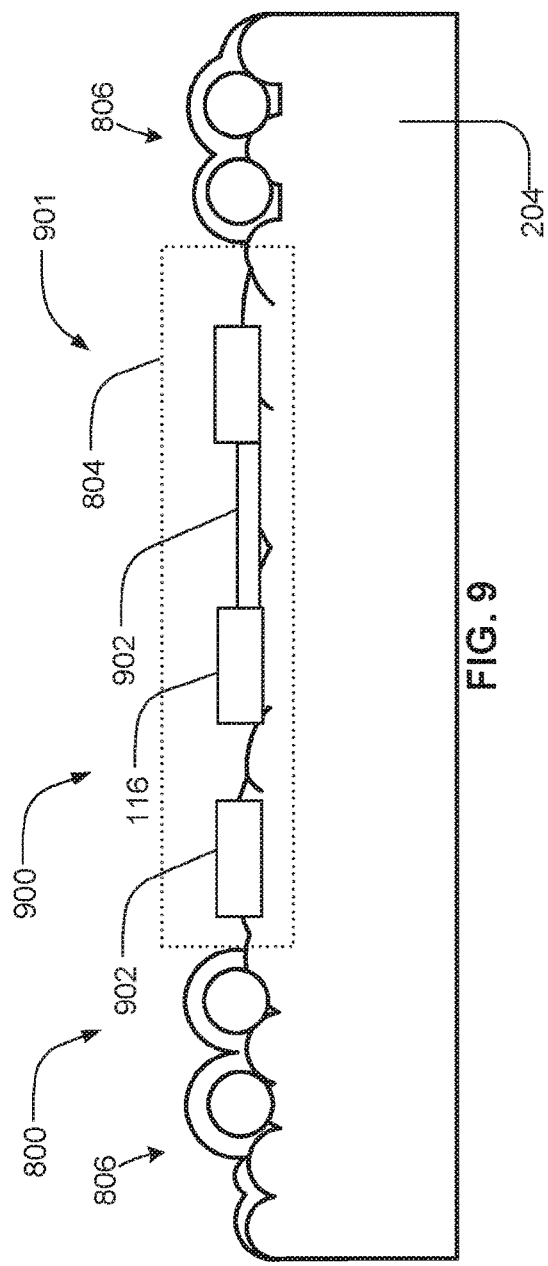

POST-PRINT PROCESSING OF THREE DIMENSIONAL (3D) PRINTED OBJECTS

BACKGROUND

In three-dimensional (3D) printing, an additive printing process is often used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often involves curing or fusing of the building material, which for some materials may be accomplished using heat-assisted extrusion, melting, or sintering, and for other materials may be accomplished using digital light projection technology.

BRIEF DESCRIPTION OF THE DRAWINGS

FIG. 5A illustrates another example 3D printed object manufactured via the example post-print treatment system of FIG. 1.

FIG. 5B is a cross-sectional view of the example 3D printed object of FIG. 5A taken along the 5B-5B line.

FIG. 6 illustrates another example 3D printed object manufactured via the example post-print treatment system of FIG. 1.

FIG. 8 is an enlarged schematic side view of the example 3D printed object at a third state after formation, but prior to processing via the post-print treatment system 100 of FIG. 1.

FIG. 9 is an enlarged schematic side view of the example 3D printed object at a fourth state after processing via the example post-print treatment system 100 of FIG. 1.

Figure 1:
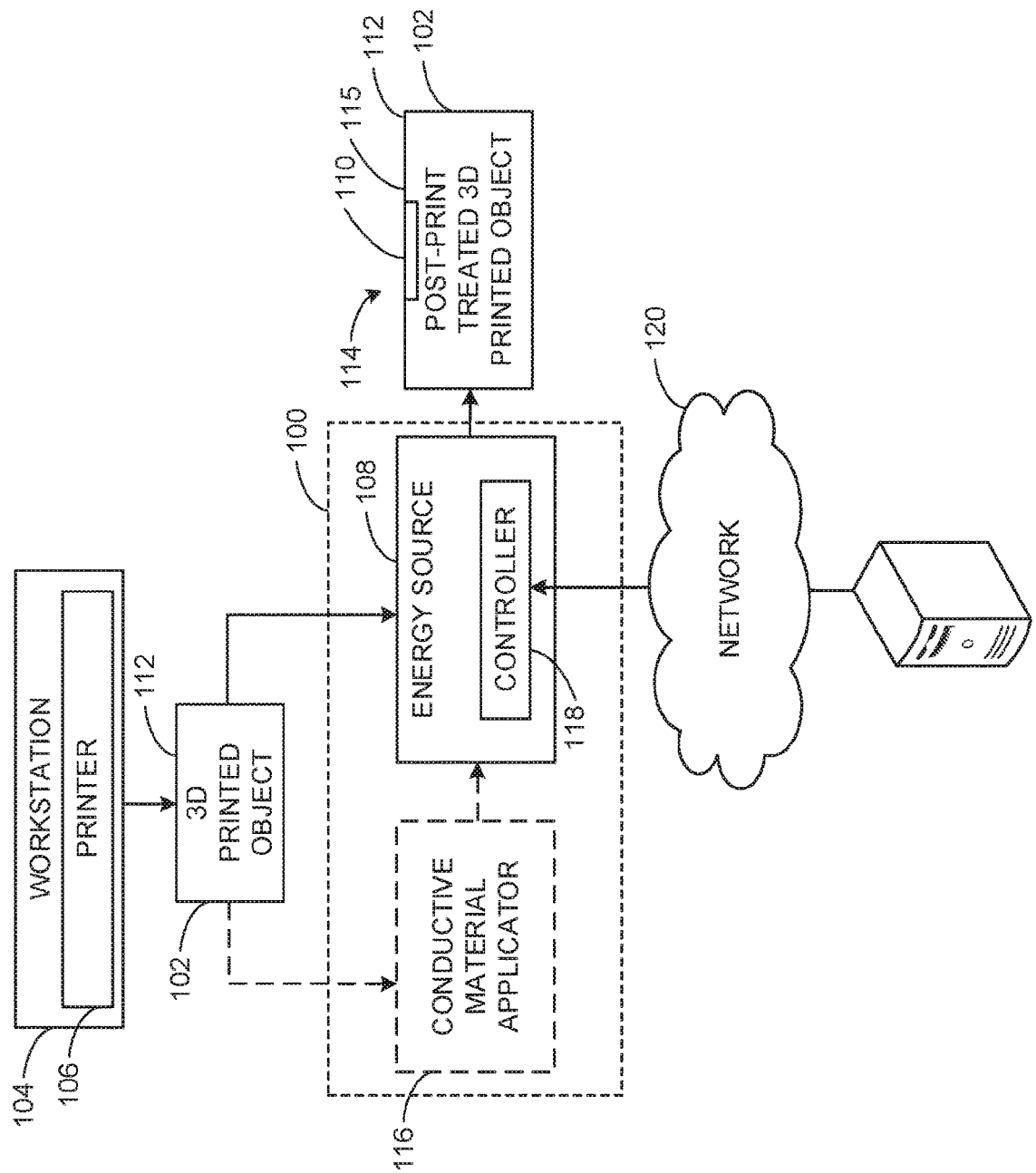
FIG. 1 is a block diagram an example post-print treatment system that can be employed to process or treat three-dimensionally (3D) post-printed products in accordance with the teachings disclosed herein.

Where ever possible the same reference numbers will be used throughout the drawing(s) and accompanying written description to refer to the same or like parts. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples.

DETAILED DESCRIPTION

Certain examples are shown in the identified figures and disclosed in detail herein. Although the following discloses example methods and apparatus, it should be noted that such methods and apparatus are merely illustrative and should not be considered as limiting the scope of this disclosure.

As used herein, directional terms, such as "upper," "lower," "top," "bottom," "front," "back," "leading," "trailing," "left," "right," etc. are used with reference to the orientation of the figures being described. Because components of various examples disclosed herein can be positioned in a number of different orientations, the directional terminology is used for illustrative purposes and is not intended to be limiting.

Three-dimensionally (3D) printed objects can be printed using, for example, a multi-jet fusion (MJF) process. MJF is a powder-based technology that does not use lasers. The powder bed is heated uniformly at the outset. A fusing agent is jetted where particles need to be selectively molten, and a detailing agent is jetted around the contours to improve part resolution. While lamps pass over the surface of the powder bed, the jetted material captures the heat and helps distribute the heat evenly.

However, 3D printed objects that are printed using, for example, an MJF process, may have a relatively rough surface caused by poor surface flatness on a microscale level along with partially melted powder particles attached or adhered to the surfaces of the objects. The presence of the extra powder particles may also degrade the optical appearance of the objects because the excess powder particles may have a different color than the main bodies of the objects. For instance, the excess powder particles may result in the colors of the 3D printed objects being duller than intended (e.g., a white-film illusion). These issues may arise due to temperature gradients near the surface of the 3D printed object. That is, uniform melting of the surface of the 3D printed object and the excess adhered powder particles may involve excessive heating, which may cause the 3D printed object to be distorted. The distortion may be avoided by maintaining the temperature within the bulk of the 3D printed object sufficiently low, but this may result in the 3D printed object having a relatively rough surface. The rough surface reflects light away from the surface, thereby making the surface appear as though a film (e.g., a white-film) is present over the 3D printed object.

Example methods and apparatus disclosed herein relate to post-print treatment of 3D printed objects. Some example disclosed herein provide post-print methods for treating 3D printed objects manufactured via MJF technology. In some examples, the examples disclosed herein provide post-print methods for treating 3D printed objects manufactured via conventional 3D printing technology.

Example methods disclosed herein can be employed to create designed patterns or features on select portions of the 3D object. Specifically, the methods disclosed herein employ a precision laser to selectively reflow the polymer on select portions of the 3D product to decrease a surface roughness of the selected portion, while a surface roughness of the non-selected portions of the outer surface surrounding the selected portion(s) remains relatively higher than a surface roughness of the selected portion(s). Reducing the surface roughness reduces an amount of reflected light and, thus, allows more light to penetrate or enter the surface of the selected portion and reduce a dullness characteristic of the selected portion of the outer surface of the 3D printed object processed by the laser (e.g., compared to the non-processed portion of the outer surface). Such contrast formed between the processed selected portions and the non-selected portions define a discernible pattern on the outer surface of the 3D printed object. Additionally, in some examples, the reflow of polymer away from a main body of the 3D printed object exposes a body of the 3D printed object. In some such examples, the exposed portion of the main body may have a different color (e.g., a black color) compared to a color (e.g., a dull grey color) of the non-processed portions of the main body including the non-processed portions that include the polymer (e.g., excess adhered powder particles), thereby providing a contrast from an effective change in color (e.g., black color vs. dull grey color) between the processed portions which underwent polymer reflow and the non-processed portions including the polymer. For example, the methods disclosed herein employ a laser to reflow polymer on an outer surface of a 3D object formed by MJF processing to create designed patterns and/or high gloss areas.

As a result, reducing a surface roughness of a select portion of an outer surface of the 3D printed object exposes a more vivid or brighter color (e.g., a "true" color) of the 3D printed object at the selected portion(s) compared to the non-selected or non-processed portion(s). To this end, the combination of a relatively high surface roughness characteristic and a relatively low surface roughness characteristic (e.g., a smoother surface finish) may be used to create desirable features or patterns on the surface of the 3D printed object (e.g., a MJF 3D product). In some examples, a first portion of an outer surface of a 3D MJF product having a surface roughness that is less than a surface roughness of the non-selected surface produces a desired pattern (e.g., a high contrast and/or a high gloss effect, indicia, a logo, etc.). For example, an MJF 3D product processed with example methods disclosed herein can produce a high gloss surface finish (e.g., a black color surface) compared with an otherwise matte gray or white surface of an unprocessed MJF 3D product.

In some examples, a laser-writer may be employed to provide a selective energy source to cause reflow of polymer (smoothing of the rough surface finish) at specific locations of the 3D (e.g., MJF) product. Specific features may include, for example, high contrast areas, high gloss surface features, visually aesthetic designs, QR codes, gray-scale features, and/or any combination thereof, and/or any other feature(s).

Some example methods disclosed herein may be employed to create conductive features (e.g., electronic components) on select portions of a 3D printed product. Example methods disclosed herein employ a laser to selectively sinter select portions of an outer surface of the 3D printed part, such as for example a metal nanoparticle 3D printed product, to produce electronic components. For example, a laser may be employed to selectively sinter metal nanoparticle fluids placed or coupled upon the outer surface of the 3D printed product to create conductive feature(s). In some examples, post-treatment of a 3D printed object includes applying a metal nanoparticle fluid to an outer surface of the 3D printed object and processing (e.g., select portions of) an outer surface with a laser to create desired conductive feature(s). The conductive features can include, for example, circuitry, traces, resistors, capacitors, antennas, passive radio frequency identification device (RFID) tags, etc. Thus, unlike conventional 3D printed parts, example methods disclosed herein do not require a conductive ink to be incorporated into the 3D printer itself. In other words, the 3D printed part can be formed via ink or material(s) (e.g., powder, polyamide, etc.) that does not include a conductive ink or material.

Turning more specifically to the illustrated examples, FIG. 1 depicts an example post-print treatment system 100 that can be employed to process or treat three-dimensionally (3D) post-printed products. For example, the post-print treatment system 100 of the illustrated example processes a 3D printed object 102 that is manufactured via a workstation 104. The workstation 104 of the illustrated example includes a printer 106 (e.g., a 3D printer) for producing the 3D printed object 102. In some examples, the workstation 104 of the illustrated example employs MJF technology to fabricate the 3D printed object 102. For example, the workstation 104 of the illustrated example may be a Jet Fusion 4200 series 3D printer manufactured by Hewlett-Packard. The 3D printed object 102 can be composed of polymers including, but not limited to, nylons (e.g., nylon 12, nylon 11, nylon 6,6, nylon 6, etc.), polypropylenes, polyethylene, thermoplastic polyurethane and/or any other semi-crystalline thermoplastic(s) and/or polymer material(s). While the example of FIG. 1 depicts a multi-jet fusion (MJF) process, any appropriate 3D printing and/or lithography process can implement examples disclosed herein. According to an example, the 3D printed object 102 may be formed of various types of materials. For instance, powder particles forming the 3D printed object 102 may be polymer particles, metallic particles, ceramic particles, a mixture of polymer, metal, and/or ceramic particles, etc.

To process the 3D printed object 102, the post-print treatment system 100 includes an energy source 108. The energy source 108 of the illustrated example can form features 110 (e.g., aesthetic features, conductive features, etc.) on an outer surface 112 of the 3D printed object 102. Specifically, the energy source 108 of the illustrated example creates or produces features 110 on a first or processed portion 114 (e.g., a selected portion) of the outer surface 112 of the 3D printed object 102. To create or produce features 110 on the select portion 114 of the outer surface 112 of the 3D printed object 102, the energy source 108 of the illustrated example produces and/or directs heat to the selected portion 114 of the 3D printed object 102. Specifically, the energy source 108 provides precision energy to process only the processed portion 114 and does not apply energy to a second or non-processed portion 115 (e.g., a non-selected portion) of the outer surface 112. A contrast formed between the processed portion 114 processed by the energy source 108 and the non-processed portion 115 that is not processed by the energy source 108 defines a discernible or desired pattern on the outer surface 112 of the 3D printed object 102. In other words, the post-print treatment system 100 of the illustrated example alters a surface finish of the processed portion 114 (e.g., by causing polymer to reflow) compared to a surface finish of the non-processed portion 115 to form the features 110 and/or pattern on the outer surface 112 of the 3D printed object.

By way of example, the energy source 108 of the illustrated example may be a laser. For example, the laser can be a laser ranging in power from 10 watts to 75 watts. The laser operates at 70 inches per second when at 100% speed. In some examples, the energy source 108 may be a device that is to provide an instantaneous pulse, burst, flashes, or sub-flashes of radiation (e.g., a laser) in the form of radiation and/or light onto the outer surface 112 of the 3D printed object 102. In some examples, the energy source 108 can rotate and/or move relative to the 3D printed object 102 to generate the features 110 (e.g., pattern(s)) on the outer surface 112 of the 3D printed object 102. In some examples, the outer surface 112 is substantially a flat surface (e.g., a 2D surface). In some examples, the outer surface 112 is a non-flat surface (e.g., a contoured, circular, spherical, etc.) and/or any other shaped surface. In some examples, the energy source 108 may include an external structure (e.g., an external stage) that can rotate and/or move the 3D printed object 102 relative to the energy source 108 to generate the features 110 on the outer surface 112 of the 3D printed object 102. In some such examples, processing a desired pattern onto a surface (e.g., a curved or spherical surface) of the 3D printed object 102 may be performed via layering (e.g., in a layer-wise fashion). For instance, to create a pattern (e.g., a logo) on a curved surface a desired pattern (e.g., a final logo), the energy source 108 and/or the controller 118 may analyze the outer surface 112 (e.g., a curvature of the outer surface 112) and/or receive input values (e.g., via a user input) defining characteristics (e.g., a radius of curvature, etc.) of the outer surface 112. The energy source 108 and/or the controller 118 may slice or divide the desired pattern into a plurality of planes (e.g., flat planes, 2D planes) between an uppermost end of the pattern and a lowermost end of the pattern. The controller 118 may cause the energy source 108 to process portions of the desired pattern lying in a first one of the planes first, process portions of the desired pattern lying in a second one of the planes second, etc. until the designed pattern is formed. Additionally, in some examples, the controller 118 causes the 3D product to move (e.g., in any one of three translational axes or three rotational axes) relative to the energy source 108 (e.g., a laser) to enable the energy source 108 to process portions of the desired pattern associated with respective ones of the planes.

In some examples, prior to processing the 3D printed object 102 via the energy source 108, a conductive material applicator 116 applies a conductive material to the outer surface 112 of the 3D printed object 102 (e.g., after the 3D printed object 102 is printed via the workstation 104). In some examples, the conductive material provided by the conductive material applicator 116 may include a metal nanoparticle ink (e.g., an Ag NP ink) and/or other material(s) capable of providing conductive characteristics after processing by the energy source 108. In some such examples, the energy source 108 can process the select portion 114 of the outer surface 112 of the 3D printed object 102 to create or generate the features 110 having electrically conductive characteristic(s) on the outer surface 112 of the 3D printed object 102. For example, the conductive material can be a metallic nanoparticle ink that can be applied to the outer surface 112 of the 3D printed object 102 after the workstation 104 produces the 3D printed object 102, but before the 3D printed object 102 is processed by the energy source 108. In this manner, the workstation 104 can produce the 3D printed object 102 without use of a conductive material (e.g., a conductive ink or polymer). The energy source 108 can sinter or otherwise heat a select portion of the outer surface 112 having the conductive material to, for example, fuse or couple the nanoparticle elements and create a conductive feature or element on the outer surface 112 of the 3D printed object 102.

To control the energy source 108, the post-print treatment system 100 includes a controller 118. To generate the feature 110 on the outer surface 112 of the 3D printed object 102, the controller 118 of the illustrated example controls a location and/or operation of the energy source 108 relative to the selected portion 114 of the outer surface 112. For example, the controller 118 can receive instructions representative of a desired pattern to be created or generated on the outer surface of the 3D printed object 102. The controller 118 of the illustrated example causes the energy source 108 to move along a pre-determined pattern relative to the outer surface 112 to generate the features on the outer surface of the 3D printed object 102. In some examples, the energy source 108 and/or the movement of the 3D printed object 102 relative to the energy source 108 (e.g., fixed in position) may be in any degrees of freedom (e.g., three translational axes and three rotational axes). The controller 118 may be a computing device, a semiconductor-based microprocessor, a central processing unit (CPU), an application specific integrated circuit (ASIC), and/or other hardware processing device. As shown, the controller 118 may be a separate component from the energy source 108. In other examples, however, the controller 118 may be integrated with the energy source 108. In this example, the energy source 108 is communicatively coupled to the 3D post-print treatment system 100 via a network 120 (e.g., a wireless network, a wired network, etc.). While an example network topology is shown in FIG. 1, any appropriate network topology may be implemented.

Figure 2:
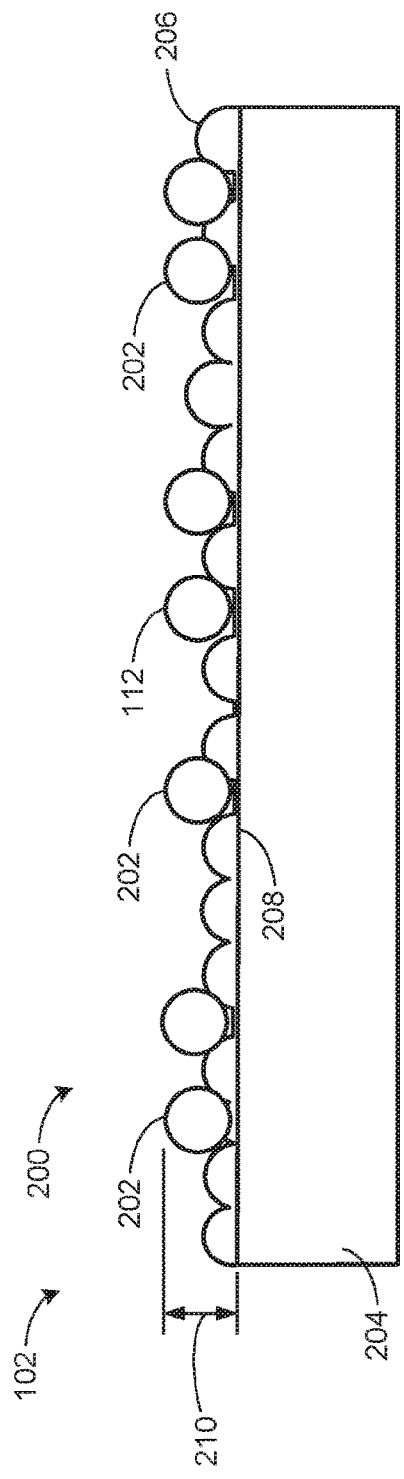
FIG. 2 is an enlarged schematic side view of an example 3D printed object at a first state after formation, but prior to processing via the example post-print treatment system of FIG. 1.

FIG. 2 is an enlarged schematic side view of the example 3D printed object 102 at a first state 200 after formation via the workstation 104, but prior to processing via the example post-print treatment system 100 of FIG. 1 (e.g., prior to receipt of energy from the energy source 108). By way of example, processing the selected portion 114 via the energy source 108 reduces a surface roughness of the selected portion 114. To this end, a contrast between the reduced surface roughness of the selected portion 114 and the surface roughness of the non-processed portion 115 forms a discernible pattern.

As shown in FIG. 2, the 3D printed object 102 may be formed through an MJF process in which powder particles are fused together through application of a fusing agent and heat. During the MJF process, excess powder particles 202 (e.g., excess adhered powder particles, stuck-on powder) may adhere or fuse to the outer surface 112 of the 3D printed object 102. That is, for instance, the excess adhered powder particles 202 may be due to some powder particles upon which fusing agent was not applied that fused to adjacent powder particles upon which fusing agent was applied because of thermal bleeding between the powder particles. In addition, the excess adhered powder particles 202 may remain fused to a main body 204 of the 3D printed object 102 following, for instance, another finishing process, such as sand blasting of the 3D printed object 102. The excess adhered powder particles 202 (e.g., stuck-on powder) may form a layer 206 extending from an outer layer 208 of the main body 204. The layer, for example, can have a thickness 210 of approximately between 5 micrometers (μm) and 220 micrometers (μm).

As the excess adhered powder particles 202 may not have been intentionally fused to the main body 204 of the 3D printed object 102, the excess adhered powder particles 202 may cause the outer surface 112 of the 3D printed object 102 to have poor surface flatness on a microscale level. Consequently, the outer surface 112 of the 3D printed object 102 may have a higher surface roughness than desired. For example, the 3D printed object 102 may have a surface roughness (e.g., a mean roughness or Roughness average (Ra)) of approximately between 1 Ra and 100 Ra). In other examples, other values can be used. As a result, the presence of the excess adhered powder particles 202 causing the increased surface roughness can degrade an optical or aesthetic appearance of the 3D printed object 102. Specifically, the excess adhered powder particles 202 reflect a significant amount of light away from the main body 204 of the 3D printed object 102. For example, the surface roughness increases an amount of light reflected from the main body 204 of the 3D printed object 102. To this end, the excess adhered powder particles 202 cause the outer surface 112 of the 3D printed object 102 to act as a translucent layer (e.g., a semitransparent or semi-opaque layer), thereby affecting a color appearance of the 3D printed object 102 (e.g., the main body 204) from saturated to dull (e.g., causing a color of the 3D printed object 102 to appear duller than intended (e.g., a white-film effect)). In other words, the rough surface reflects light away from the outer layer 208 and the main body 204 such that the outer layer 208 appears to have a film (e.g., a white-film) present over the 3D printed object 102. This degradation in the optical appearance can be caused from the partial fusing of a colored surface with the uncolored (e.g., white) powder particles from adjacent patterned powder particles (e.g., during printing process). These issues may arise due to temperature gradients near the outer surface 112 of the 3D printed object 102 during manufacturing via the workstation 104. Excessive powder particles (e.g., white powder) can adhere (e.g., become stuck) onto the surface of the 3D printed object 102 (e.g., an outermost surface of a main body the 3D printed object 102) given that a sufficiently high thermal gradient cannot be created at the surface of the part during a 3D printing process such as to keep the exterior excess power particles (e.g., white powder) from having zero fusing onto a colored surface of a main body of the 3D printed object 102 while still allowing for full fusing of the colored surface and an interior of the 3D printed object 102. The resultant partial fusing of the excess powder particles (e.g., white powder) external to the part surface causes this powder to stick onto the part, even after post-processing (e.g., sand-blasting) has been performed.

In some examples, if a surface roughness of the 3D printed object 102 is less than a threshold to form a contrast between the processed portion 114 and the non-processed portion 115, the outer surface 112 of the 3D printed object 102 may be processed via secondary manufacturing process to increase a surface roughness of the outer surface 112. For example, a surface roughness of the outer surface 112 may be increased via machining after formation of the 3D printed object 102. In some examples, a layer of material (e.g., a layer of polymer) may be applied to the outer surface 112 of the 3D printed object 102 prior to processing the 3D printed object 102 via the energy source 108.

Figure 3:
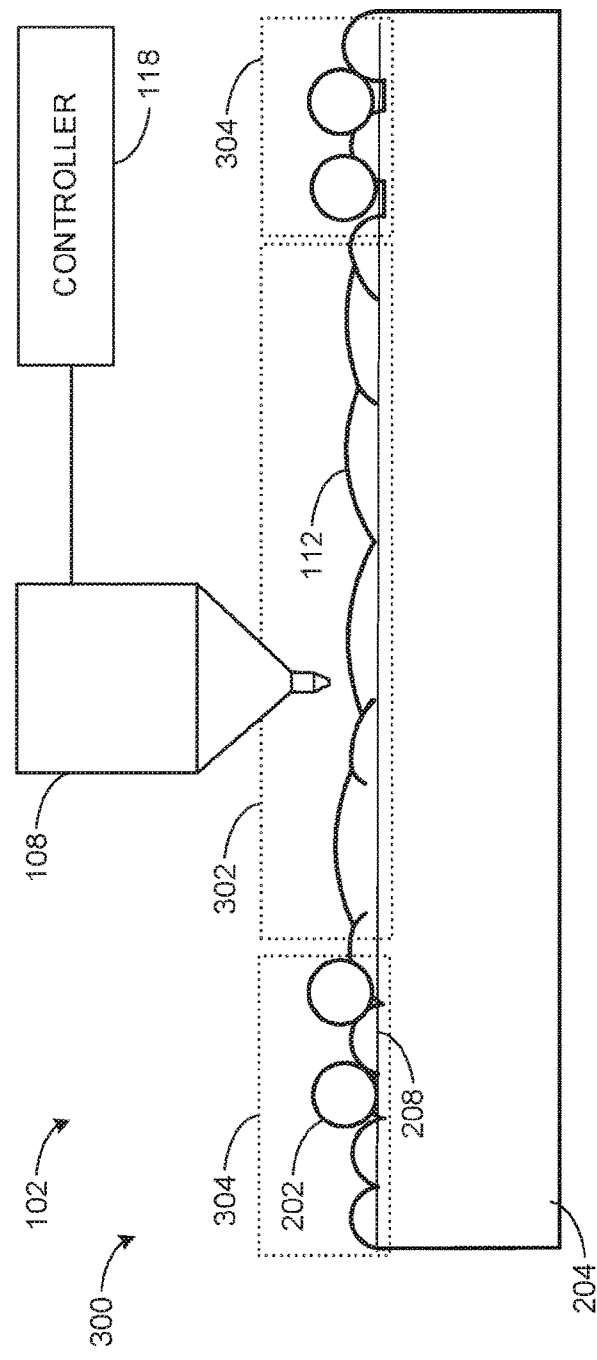
FIG. 3 is an enlarged schematic side view of an example 3D printed object at a second state after processing via the example post-print treatment system of FIG. 1.

FIG. 3 is an enlarged schematic side view of the example 3D printed object 102 at a second state 300 after processing via the post-print treatment system 100 of FIG. 1. For example, the 3D printed object 102 is processed by receiving energy from the energy source 108. Specifically, the energy source 108 of the illustrated example decreases a surface roughness of the outer surface 112 of the 3D printed object 102. To reduce a surface roughness of the outer surface 112 (e.g., provide a smoother outer surface), the energy source 108 provides energy to melt and reflow the excess adhered powder particles 202 (e.g., a polymer) on a select or processed portion 302 of the outer surface 112 of the 3D printed object 102. As a result, a smoother surface reflects a less amount of light away from the processed portion 302 of the outer surface 112, thereby exposing a brighter or move vivid color of the main body 204 compared to a non-processed portion 304 (e.g., a non-selected portion) of the outer surface 112. As a result, the combination of a surface roughness of the non-processed portion 304 and a surface roughness (e.g., a smoother surface finish) of the processed portion 302 provide a contrast sufficient to create the features 110 (e.g., patterns) on the outer surface 112 of the 3D printed object 102. Thus, the post-print treatment system 100 of FIG. 1 applies energy to the processed portion 302 to alter a surface finish (e.g., a smooth surface) of the processed portion 302 relative to a surface finish (e.g., a non-smooth surface) of the non-processed portion 304.

To process the portion of the 3D printed object 102, the controller 118 controls the energy source 108 to apply energy (e.g., heat) onto the 3D printed object 102 in a specific or predetermined pattern. More particularly, the controller 118 controls the energy source 108 and causes the energy source 108 to apply heat (e.g., via a laser) onto the processed portion 302 of the 3D printed object 102 at an intensity (e.g., at an energy level, at a speed, and/or for a duration of time) that is sufficient to cause the excess adhered powder particles 202 of the outer surface 112 to melt and flow, but insufficient to cause the outer layer 208 of the main body 204 of the 3D printed object 102 to melt. Accordingly, the controller 118 may control the energy source 108 to apply a sufficient intensity of energy onto the 3D printed object 102 to cause excess adhered powder particles 202 on the outer surface 112 of the 3D printed object 102 to melt and flow without causing the outer surface 308 of the main body 204 of the 3D printed object 102 to melt. In this regard, the excess adhered powder particles 202 on the processed portion 302 of the outer surface 112 of the 3D printed object 102 starts to flow and, thus, fills surface voids and/or depressions while also melting surface attached particles to decrease the thickness 210 of the layer 206. As a result, causing the excess adhered powder particles 202 on the processed portion 302 of the outer surface 112 of the 3D printed object 102 to melt and flow reduces a surface roughness of the processed portion 302 of the outer surface 112. Thus, unlike traditional engraving methods that remove material from a surface of a 3D printed object via cutting or evaporating/decomposing material, the outer surface 112 of the 3D printed object 102 is treated by remelting the processed portion 302 of the outer surface 112 instead of evaporating or decomposing material to remove a thickness of the outer surface 112 to create the features 110 (e.g., a desired effect).

Further, only a relatively small amount of energy from the energy source 108 is needed to melt the excess adhered powder particles 202. Specifically, there is an additional heating effect for 3D printed objects (e.g., the 3D printed object 102) manufactured via MJF technology, which assists in the remelting phenomena. For example, given the excess adhered powder particles 202 (e.g., the white powder) from the MJF printing process, the outer surface 112 of the 3D printed object 102 will not be as light-absorbing given the light scattering (e.g., with minimal light absorption) from the excess adhered powder particles 202. However, once melting of the excess adhered powder particles 202 begins, a more-light absorbing surface is created (e.g., the surface becomes less light scattering and more absorptive of light from a carbon black of the main body 204 of the 3D printed object 102). This accelerates heating, thereby using a small amount of energy.

Additionally, application of heat by the energy source 108 does not distort a shape or dimensional profile of the 3D printed object 102 because the energy source 108 can apply heat to the processed portion 302 of the outer surface 112 without melting the outer layer 208 of the main body 204. For example, typically, the energy source 108 applies energy to a selected portion (e.g., the processed portion 302) of the outer surface 112 for a relatively short duration (e.g., approximately between 1 and 1000 microseconds, between approximately 20 and 30 microseconds, 28 microseconds, etc.). Such duration or timing range depends upon laser power and overlap of laser emission and polymer absorption curves. Given the quick time dynamics of the energy treatment (e.g., approximately 28 microseconds of laser absorption) and a finite conductivity of the excess adhered powder particles 202 (e.g., a polymer material), a warpage of the 3D printed object 102 (e.g., which may occur if the 3D printed object 102 approached a melting temperature in the main body 204 as opposed to just at the outer surface 112) is not observed during surface treatments via the energy source 108.

In addition to controlling the energy source 108, the controller 118 may control the position of the 3D printed object 102 with respect to the energy source 108. By the way of particular example, after applying heat to the part of the 3D printed object 102 facing the energy source 108, the controller 118 may change an orientation of the 3D printed object 102 with respect to the energy source 108, so that energy source 108 can apply heat to another portion of the 3D printed object 102 that has not yet been processed by the energy source 108. For instance, the 3D printed object 102 may be positioned on a movable platform (not shown) and the controller 118 may control the movable platform such that different parts of the 3D printed object 102 may face the energy source 108 at different times.

As shown in FIG. 3, following application of energy from the energy source 108 onto the processed portion 302 of the outer surface 112 of the 3D printed object 102, an outermost layer of the portion 302 of the outer surface 112 melts or flows to reduce a surface roughness (e.g., provide a smoother surface), thereby improving the optical appearance of the 3D printed object 102. Specifically, the controller 118 may control the energy source 108 in a specific pattern on the outer surface 112 of the 3D printed object 102 to form the desired features 110. In other words, the combination of the processed portion 302 (e.g., a smooth portion) of the outer surface 112 and the non-processed portion 304 of the outer surface 112 provides an optical contrast that defines the features 110. Specific features may include, for example, high contrast areas, high gloss surface features, visually aesthetic designs, QR codes, gray-scale features, logos, indicia and/or other features.

While an example manner of implementing the post-print treatment system 100 is illustrated in FIG. 1, one or more of the elements, processes and/or devices illustrated in FIG. 1 may be combined, divided, re-arranged, omitted, eliminated and/or implemented in any other way. Further, the workstation 104, the printer 106, the conductive material applicator 116, the energy source 108, the controller 118 and/or, more generally, the example post-print treatment system 100 of FIG. 1 may be implemented by hardware, software, firmware and/or any combination of hardware, software and/or firmware. Thus, for example, any of the workstation 104, the printer 106, the conductive material applicator 116, the energy source 108, the controller 118 and/or, more generally, the example post-print treatment system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the workstation 104, the printer 106, the conductive material applicator 116, the energy source 108, the controller 118 and/or, more generally, the example post-print treatment system 100 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example post-print treatment system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Example effects of processing (e.g., melting) portions of 3D printed objects are provided in FIGS. 4-7. For example, example 3D printed objects 400-700 of FIGS. 4-7 were created with an HP Jet Fusion 4200 3D printer. The 3D printed objects 400-700 were sandblasted at 30 pounds per square inch (psi). The 3D printed objects 400-700 were then processed via an energy source (e.g., the energy source 108 of FIG. 1). The energy source can be a 75-Watt laser-writer (e.g., from Universal Laser Systems, model PLS6.75) that can operate at 70 inches per second when running at 100% speed. Other energy sources with other power and speed operating parameters may be used. The 3D printed objects 400-700 were post-print treated via the laser-writer at optimal conditions for the power and speed required to selectively remelt portions of an outer surface of the 3D printed objects 400-700. In some examples, the optimal conditions for remelting or reflowing the excess adhered powder particles 202 were at or approximately 100% power and 100% speed of the laser writer, which operated at 500 points per inch. The working distance of a laser to the outer surface of the 3D printed objects was approximately 7 millimeters (mm). Other operating parameters may be used.

Figure 4:
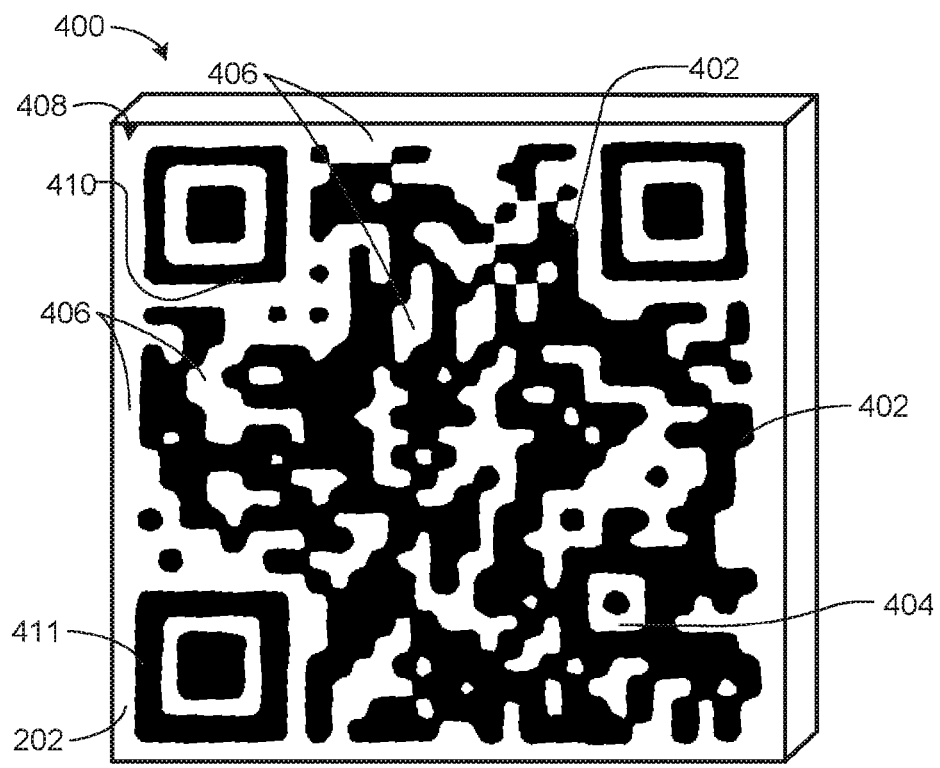
FIG. 4 illustrates an example 3D printed object manufactured via the example post-print treatment system of FIG. 1.

FIG. 4 is an example 3D printed object 400 manufactured via the post-print treatment system 100 of FIG. 1. In particular, the 3D printed object 400 of the illustrated example is processed via the energy source 108 (FIG. 1). Specifically, a first or processed portion 402 (e.g., a select portion) of an outer surface 404 of the 3D printed object 400 is processed by the energy source 108 and a second or non-processed portion 406 (e.g., a non-selected portion) is not processed by the energy source 108. Thus, the processed portion 402 processed by the energy source 108 has a surface roughness (e.g., a Roughness average) that is less than a surface roughness (e.g., a Roughness average) of the non-processed portion 406 that is not processed by the energy source 108. Specifically, a variation of surface roughness of the processed portion 402 processed by the energy source 108 and the non-processed portion 406 that is not processed by the energy source 108 creates a pattern 408 on the outer surface 404 of the 3D printed object 400.

Specifically, a color of a main body 410 (e.g., the main body 204) of the 3D printed object 400 of the illustrated example has a black color. In other examples, the main body 410 of the 3D printed object 400 may have a red color, a blue color, a green color, and/or any other color other than white or other color(s) that would provide poor contrast between the outer surface 404 and the main body 410. Given the excess adhered powder particles 202 on the outer surface 404 of the 3D printed object 400, the processed portion 402 of the 3D printed object 102 of the illustrated example that is processed by the energy source 108 allows for the excess adhered powder particles 202 on the processed portion 402 to melt and flow away from the main body 410 (e.g., an outer layer 411 of the main body 410). As a result, excess adhered powder particles 202 that melt and flow from the processed portion 402 due to exposure of energy via the energy source 108 becomes transparent, thereby revealing the main body 410. In other words, removing the excess adhered powder particles 202 from the processed portion 402 reduces or eliminates interparticle surfaces that scatter light (and has minimal crystallinity given the quick cooling rates) along the processed portion 402. With the black color exposed via the processed portion 402 (e.g., the processed portion or pattern), a high contrast is generated between the non-processed portion 406 (e.g., the non-processed portion, the original surface) and the processed portion 402, allowing for the generation of a readable pattern 408. Due to a contrast of color between the processed portion 402 and the non-processed portion 406, a readable pattern such as the pattern 408 of the illustrated example can be generated on the outer surface 112 of the 3D printed object 102. For example, the pattern 408 of the 3D printed object 400 of the illustrated example defines a quick response (QR) code. In other examples, other machine-readable or human-readable patterns may be created.

FIG. 5A is another example 3D printed object 500 manufactured via the post-print treatment system 100 of FIG. 1. FIG. 5B is a cross-sectional view of the example printed object 500 of FIG. 5A taken along line 5B-5B of FIG. 5A. Referring to FIGS. 5A and 5B, the 3D printed object 500 of the illustrated example has been processed via the energy source 108 (FIG. 1). Specifically, only a first or processed portion 502 (e.g., a select portion) of an outer surface 504 of the 3D printed object 500 of the illustrated example is processed by the energy source 108. As a result, the processed portion 502 processed by the energy source 108 and a second or non-processed portion 506 that is not processed by the energy source 108 form a pattern 508. The pattern 508 of the illustrated example generates a logo or indicia 510 on the outer surface 504 of the 3D printed object 500. A variation in surface roughness (e.g., a Roughness average (Ra)) between the processed portion 502 and the non-processed portion 506 generates the pattern 508. Specifically, the energy source 108 causes the excess adhered powder particles 202 to melt and flow away from an outer surface 512 of a main body 514 of the 3D printed object 500, thereby exposing the processed portion 502 to greater amount of light and enabling the processed portion 502 to appear brighter than the non-processed portion 506 that includes the excess adhered powder particles 202. Thus, the pattern 508 and/or the indicia 510 is not engraved into the main body 514 of the 3D printed object 500. In other words, material composing the main body 514 is not removed (e.g., evaporated/decomposed to remove a thickness from the main body 514 of the 3D printed object 500). To this end, a thickness of the main body 514 of the 3D printed part remains unchanged prior to and after the processed portion 502 is processed or treated via the energy source 108.

FIG. 6 illustrates another example 3D printed object 600 processed by the post-print treatment system 100 of FIG. 1. Specifically, the example 3D printed object 600 of FIG. 6 illustrate a plurality of patterns 602 having different a gray-scale characteristics or effect. To this end, a 3D printed object can be created with different gray-scale characteristics. For example, the 3D printed object 600 of the illustrated example includes the plurality of patterns 602 provided on an outer surface 604 of the 3D printed object 600. Specifically, to provide the patterns 602, a first or processed portion 606 is processed via the energy source 108 and a second or non-processed portion 608 that is not processed by the energy source 108.

Specifically, each of the patterns 602 was processed at different operational parameters or settings of the energy source 108 to illustrate different gray-scale characteristic(s). For example, each one of the patterns 602 is formed at a different power setting and different speed operational setting of the energy source 108 (e.g., a laser input). For example, a first pattern 610 is formed on the outer surface 604 of the 3D printed object 600 via the energy source 108 at a laser power input of approximately 35% power and 100% speed. A second pattern 612 is formed on the outer surface 604 of the 3D printed object 600 via the energy source 108 at a laser power input of approximately 100% power and 100% speed. A third pattern 614 is formed on the outer surface 604 of the 3D printed object 600 via the energy source 108 at a laser power input of approximately 75% power and 100% speed. A fourth pattern 616 is formed on the outer surface 604 of the 3D printed object 600 via the energy source 108 at a laser power input of approximately 100% power and 85% speed. A fifth pattern 618 is formed on the outer surface 604 of the 3D printed object 600 via the energy source 108 at a laser power input of approximately 100% power and 75% speed. As a result, a gray-scale effect can be created using different operational settings (e.g., an amount of laser power input of the energy source 108). In some examples, such variation in operational settings (e.g., laser power input power and/or speed) can correlate to pixels on a 3D printed object to create a gray-scale surface image or pattern (e.g., a unitary image on the outer surface 604).

Figure 7A:
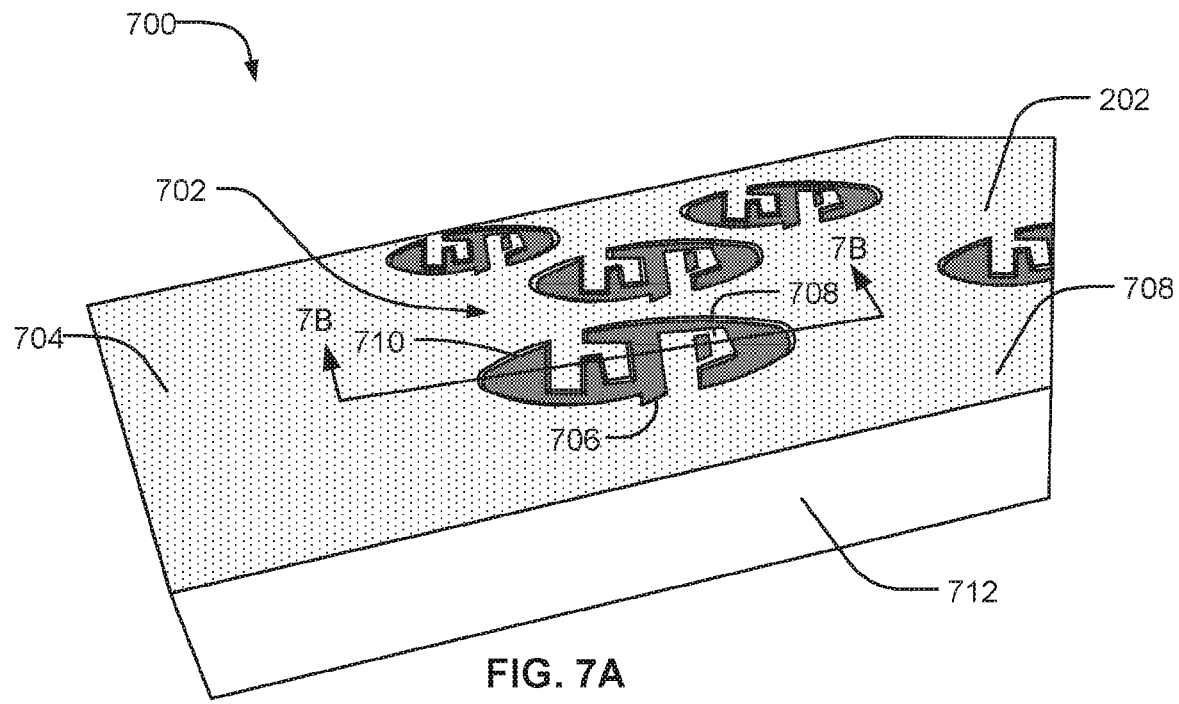
FIG. 7A illustrates yet another example 3D printed object manufactured via the example post-print treatment system of FIG. 1.
Figure 7B:
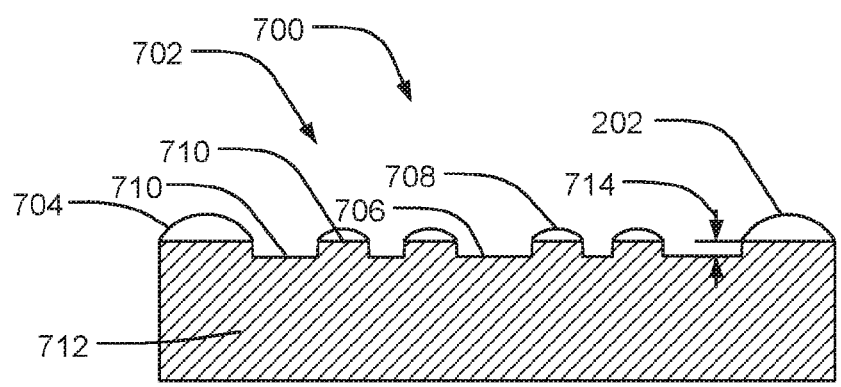
FIG. 7B is a cross-sectional view of the example 3D printed object of FIG. 7A taken along the 7B-7B line.

FIG. 7A illustrates another example 3D printed object 700 processed by the post-print treatment system 100 of FIG. 1. FIG. 7B illustrates a cross-section of the example 3D printed object 700 of FIG. 7A taken along line 7B-7B of FIG. 7A. Specifically, the example 3D printed object 700 of FIG. 7A includes an engraved pattern 702 formed on an outer surface 704 of the 3D printed object 700. To create the engraved pattern 702 of FIGS. 7A and 7B, a first or processed portion 706 (e.g., a selected portion) of the outer surface 704 of the 3D printed object 700 of the illustrated example is processed via the energy source 108 and a second or non-processed portion 708 is not processed via the energy source 108. For example, engraving the processed portion 706 of the outer surface 704 includes removing (e.g., cutting, evaporating and/or decomposing) a portion of an outer layer 710 of a main body 712 of the 3D printed object 700. Thus, unlike the 3D printed objects 200-600, a thickness 714 of at least a portion of the outer layer 710 of the main body 712 of the 3D printed object 700 of FIG. 7 is reduced or removed to create the engraved pattern 702. To remove (e.g., evaporate or decompose) the outer layer 710 of 3D printed object 700, the energy source 108 is operated at a high power and a low speed. For example, to create the engraved pattern 702, the operational characteristics of the energy source 108 of the illustrated example is set to a laser power input of 100% and speed of approximately between 1% and 15%. The excess adhered powder particles 202 remain on the non-processed portion 708 of the outer surface 704 to provide a contrast between the non-processed portion 708 and the processed portion 706 to provide the engraved pattern 702.

FIG. 8 is an enlarged schematic side view of the example 3D printed object 102 at a third state 800 after formation via the workstation 104, but prior to processing via the post-print treatment system 100 of FIG. 1. For example, the 3D printed object 102 is shown prior to receiving energy from the energy source 108. Specifically, the 3D printed object 102 of FIG. 8 includes the conductive material 802. For example, the conductive material 802 can be applied to the outer surface 112 of the 3D printed object 102 via the conductive material applicator 116 after formation of the 3D printed object 102 via the workstation 104. In this manner, the 3D printed object 102 may be formed from material(s) (e.g., polymers or inks) that do not include conductive particles.

The conductive material 802 can include, for example, silver nanoparticle ink, gold nanoparticle ink, and/or any other metal nanoparticle ink and/or any other conductive nanoparticle ink and/or material(s) having sintering temperature below a melting point of the main body 204 of the 3D printed object 102. For example, the conductive material 802 may be silver nanoparticle ink having a sintering temperature of approximately 130 degrees Celsius (° C.) and the main body 204 may be composed of a polymer (e.g., PA12 polymer) having a melting temperature of approximately 180° C. For example, the conductive material 802 may be a silver nanoparticle ink (e.g., Novacentrix JS-A101A Ag NP ink) having a sintering temperature (e.g., $T_{sinter}$~130° C.) below a melting temperature (e.g., $T_{melt}$~180° C.) of the 3D printed object 102 (e.g., PA12 polymer). In other examples, other conductive materials may be used.

The conductive material 802 of the illustrated example is painted onto the outer surface 112 of the 3D printed object 102. However, in some examples, the conductive material 802 may be applied to the outer surface 112 via an applicator, a sprayer, etc. In some examples, the conductive material 802 may have a thickness 803 of approximately between 0.1 microns and 200 micron, more specifically, 15-35 microns. In other examples, other relative thicknesses may be used. After the conductive material 802 is applied to the outer surface 112 (e.g., via the conductive material applicator 116), the 3D printed object 102 is processed via the energy source 108.

Although the conductive material 802 includes conductive elements or materials (e.g., metal nanoparticles) when coupled to the 3D printed object 102, the conductive material 802 does not define electrically conductive features (e.g., the features 116 of FIG. 1) prior to processing via the energy source 108. The energy source 108 (e.g., a laser) applies an energy (e.g., heat) to a selected portion 804 of the outer surface 112. In some examples, the conductive material 802 can be processed via the energy source 108 while the conductive material 802 is wet. In some examples, the conductive material 802 can be processed via the energy source 108 after the conductive material 802 is dry. Specifically, a first or processed portion 804 (e.g., a selected portion) is processed by the energy source 108 and a second or non-processed portion 806 (e.g., a non-selected portion) is not processed by the energy source 108.

FIG. 9 is schematic side view of the example 3D printed object 102 shown in a fourth state 901 after being processed by the example post-print treatment system 100 of FIG. 1. As noted above, the conductive features 116 are formed on the outer surface 112 of the 3D printed object 102 after processing via the energy source 108. Thus, although the conductive material 802 includes conductive elements (e.g., metal nanoparticles), the conductive elements are not coupled to provide electrically conductive features 902 prior to processing the outer surface 112 via the energy source 108. For example, the 3D printed object 102 is shown after receiving energy from the energy source 108. In the illustrated example, the processed portion 804 is processed by the energy source 108 and the non-processed portion 806 is not processed by the energy source 108 to form a pattern 900. Specifically, the pattern 900 is processed by the energy source 108 to cause the conductive material 802 to be electrically conductive along the pattern 900. In particular, the energy source 108 sinters the conductive material 802 to cause conductive nanoparticles (or other elements(s)) in the conductive material 802 to fuse together to define conductive features 902 (e.g., an electrical path or traces) along the pattern 900. The pattern 900 may include, for example, conductive traces, circuitry, antennas, resistors, capacitors, radio frequency (RF) tags, and/or any other electrical component(s). In some examples, the pattern 900 can be a circuit including resistors, capacitors, traces, etc., without needing to attach such components (e.g., resistors, capacitors, traces, etc.) to the main body 204.

In some examples, the conductive regions or features (e.g., the traces) provided by the pattern 900 can be post-plated to increase a metal thickness and decrease the overall resistance of the conductive features 902. Additionally or alternatively, following formation of the pattern 900, a capping agent (e.g., dodecyl amine) can be applied to the outer surface 112 of the 3D printed part 102. For example, the capping agent can be applied to the processed portion 804 and/or to the non-processed portion 806 (i.e., the portions not processed by the energy source 108) to prevent the non-processed portion 806 from becoming conductive (e.g., via sintering) when the 3D printed object 102 is exposed to elevated temperatures (e.g., a temperature of approximately 110° C. or multiple days over 70° C.). Application of the capping agent does not interfere with an operational characteristic of the conductive features 902 when the capping agent is applied to the processed portion 804. In some examples, the 3D printed object 102 processed at 100° C. for 1 hour to remove the ink volatiles while keeping the non-processed portion 806 from sintering and becoming conductive.

Figure 10:
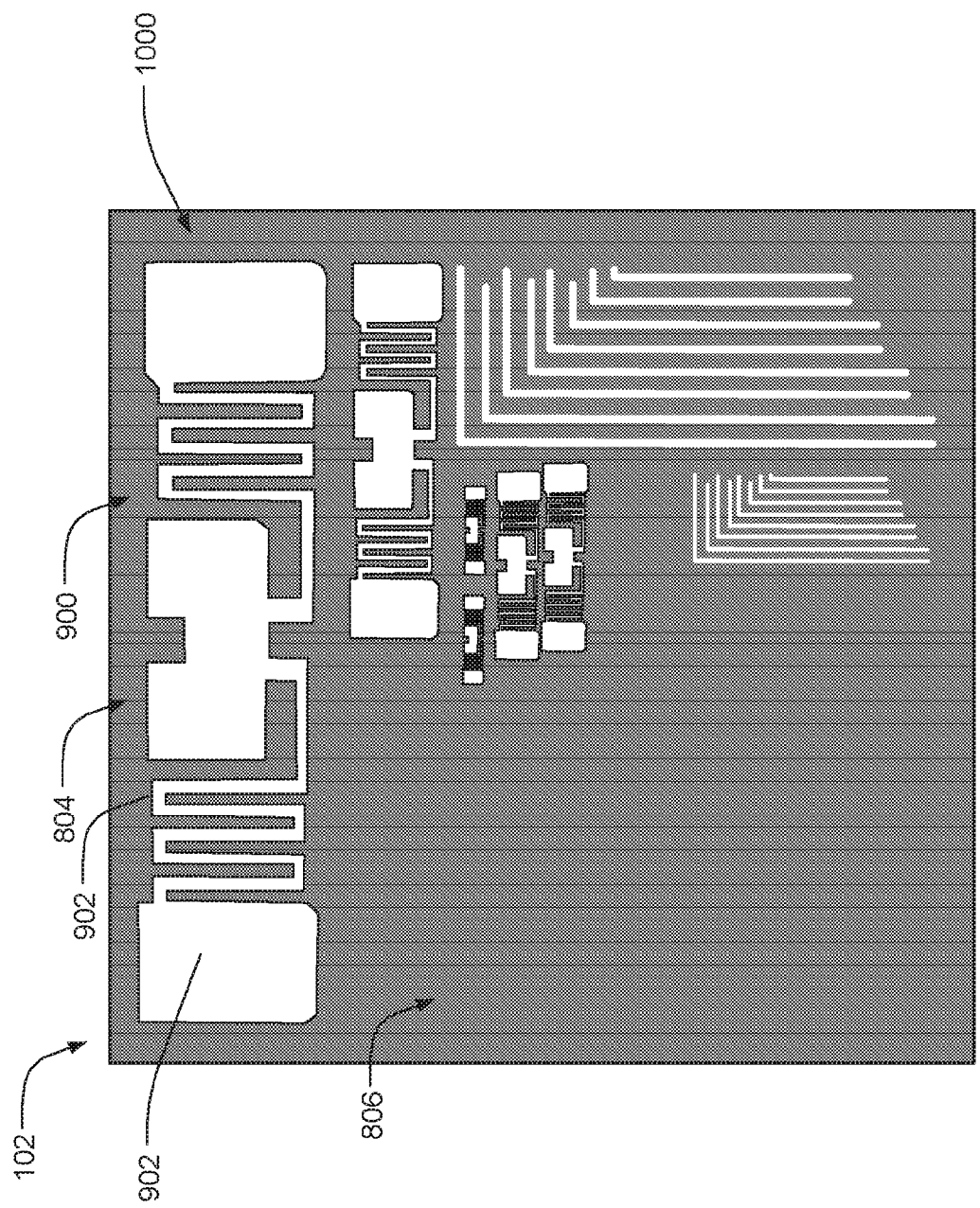
FIG. 10 is a top view of the example 3D printed object of FIG. 9.

FIG. 10 is a top view of the example 3D printed object 102 of FIG. 9. The pattern 900 of the illustrated example forms a plurality of conductive features 902 to define a circuit 1000. For example, the selected portion 804 processed by the energy source 108 forms the pattern 900. The pattern 900 can include resistors, conductive element(s), capacitors, etc. For example, a capacitor can be created from utilizing an insulating polymer between closely drawn conductive plate features formed by the pattern 900.

Figure 11:
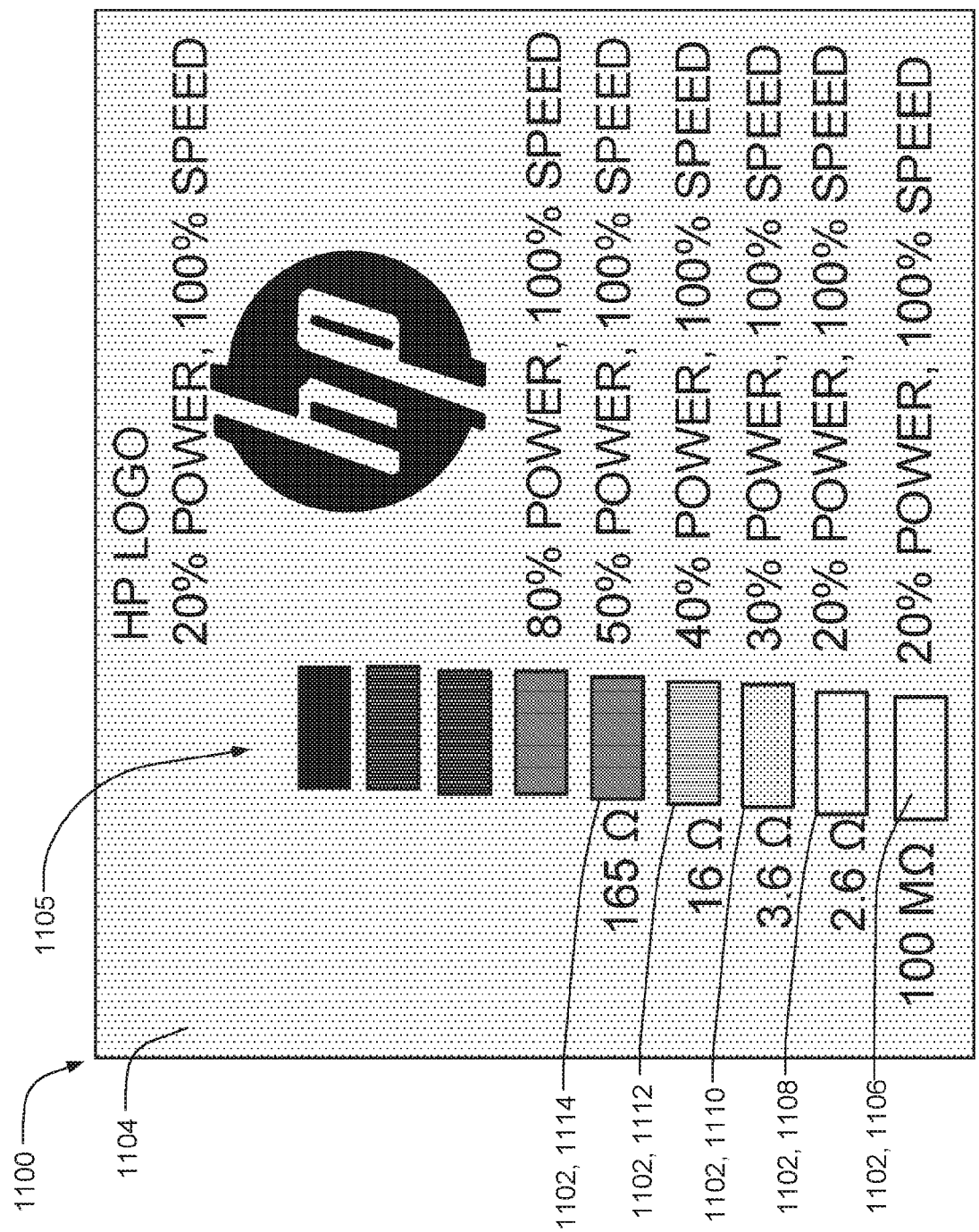
FIG. 11 illustrates another example 3D printed object processed by the example post-print treatment system of FIG. 1.

FIG. 11 illustrates another example 3D printed object 1100 processed by the post-print treatment system 100 of FIG. 1. Specifically, the example 3D printed object 1100 of FIG. 11 illustrates a plurality of resistors 1102 formed on an outer surface 1104 of the 3D printed object 1100 via the energy source 108. To this end, a 3D printed object 1100 of the illustrated example is created with the resistors 1102 each having a different resistance characteristic. For example, the 3D printed object 1100 of the illustrated example includes a plurality of patterns 1105 that were processed on select portions of the outer surface 1104 via the energy source 108. Specifically, each one of the resistors 1102 was processed at different operational settings of the energy source 108 to generate the resistors 1102 with different resistance values or characteristics. For example, each one of the resistors 1102 is formed at a different operation power setting and different operational speed setting of the energy source 108. For example, a first resistor 1106 having a resistance value of 100 milliohms (mΩ) is formed on the outer surface 1104 of the 3D printed object 1100 by operating the energy source 108 at a laser power input of approximately 10% power and 100% speed. A second resistor 1108 having a resistance value of 2.6 ohms (Ω) is formed on the outer surface 1104 of the 3D printed object 1100 by operating the energy source 108 at a laser power input of approximately 20% power and 100% speed. A third resistor 1110 having a resistance value of 3.60 is formed on the outer surface 1104 of the 3D printed object 1100 by operating the energy source 108 at a laser power input of approximately 30% power and 100% speed. A fourth resistor 1112 having a resistance value of 160 is formed on the outer surface 1104 of the 3D printed object 1100 by operating the energy source 108 at a laser power input of approximately 40% power and 100% speed. A fifth resistor 1114 having a resistance value of 165Ω is formed on the outer surface 1104 of the 3D printed object 1100 by operating the energy source 108 at a laser power input of approximately 50% power and 100% speed. In other examples, other values may be created. As a result, resistors 1102 having different resistance characteristics can be created using different operational settings (e.g., an amount of laser power input of the energy source 108).

Figure 12:
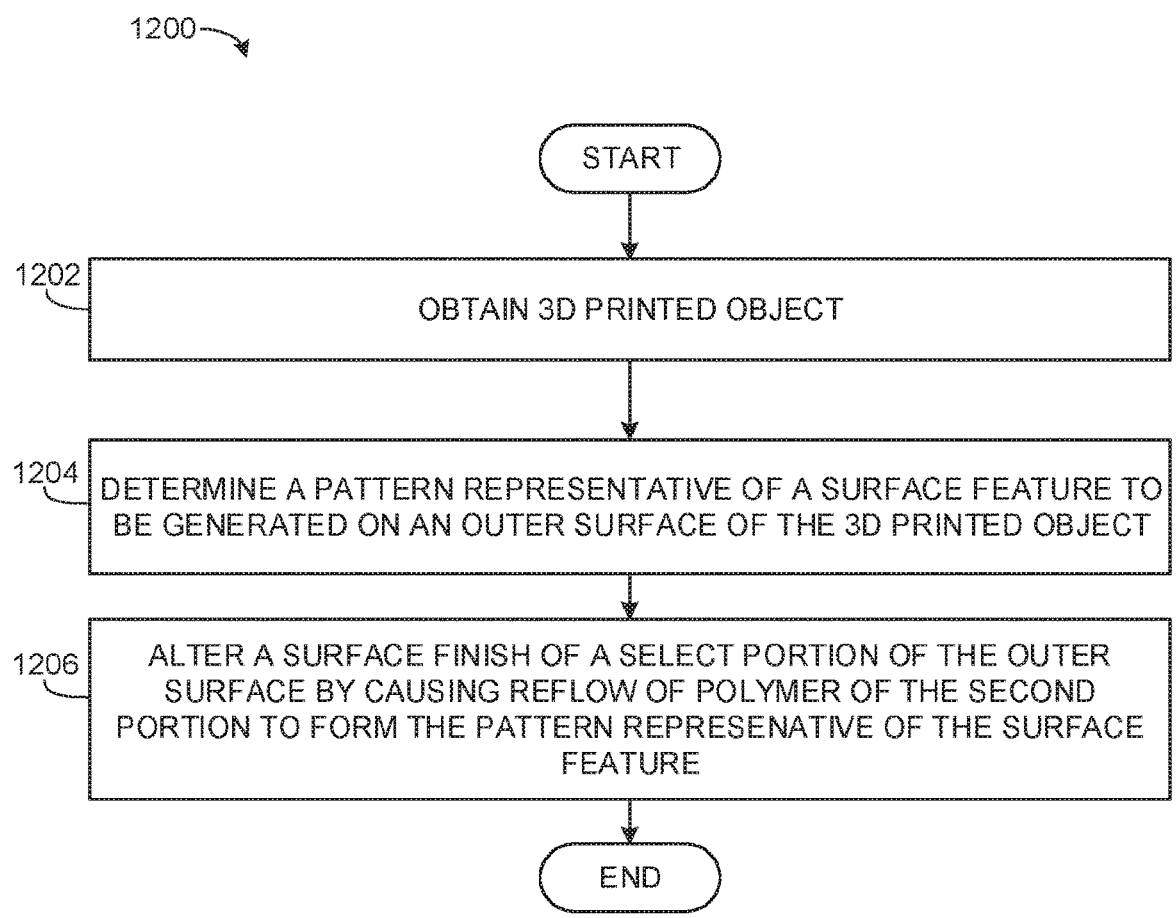
FIGS. 12 and 13 are flowcharts illustrating example methods of processing 3D printed objects disclosed herein.
Figure 13:
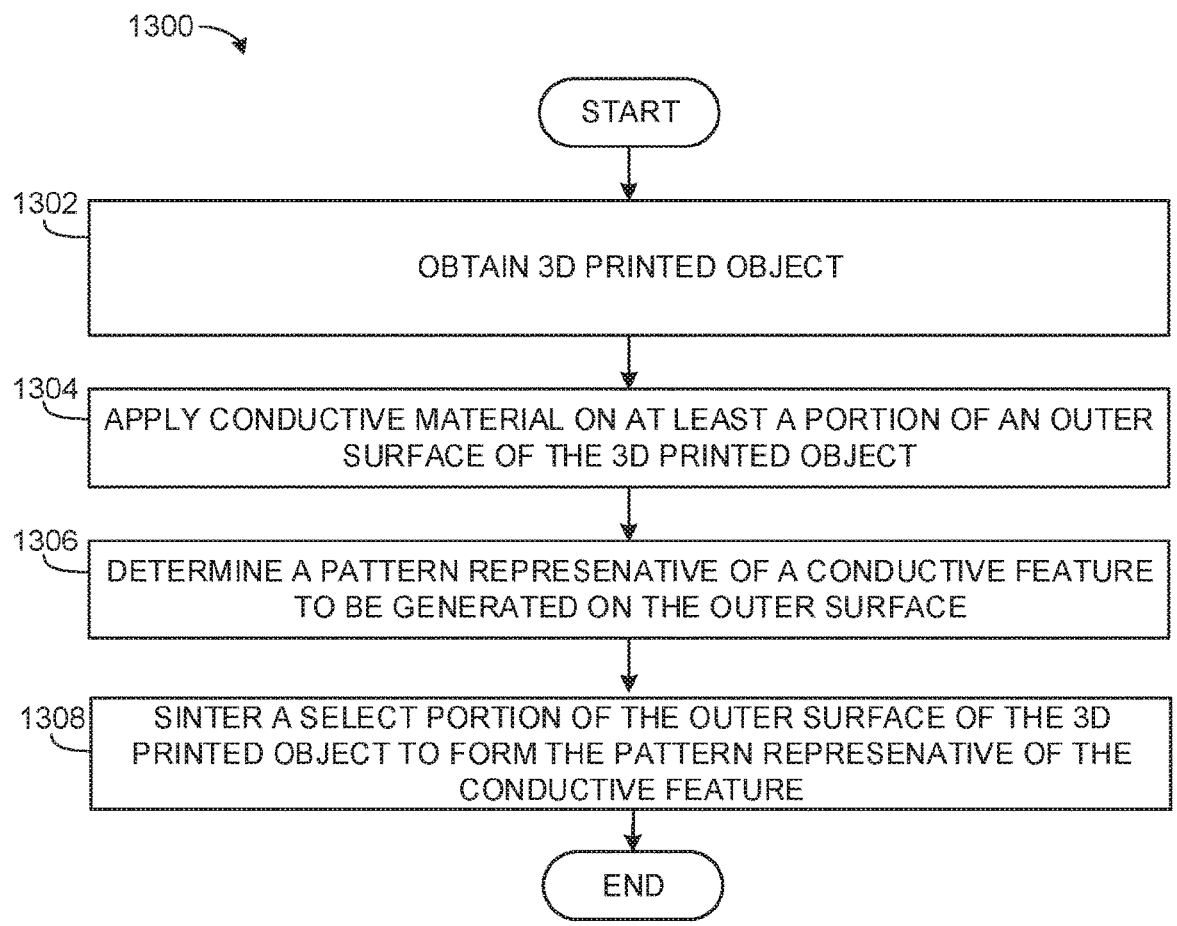

FIGS. 12 and 13 are example flowcharts representative of example methods 1200 and 1300 for post-print treatment of example 3D printed objects disclosed herein. In some examples, the blocks or processes can be re-arranged or removed, or additional blocks can be added. The example methods 1200 and 1300 of FIGS. 12-13 may be implemented by the example workstation 104, the example printer 106, the example conductive material applicator 116, the example energy source 108, the example controller 118 and/or, more generally, the example post-print treatment system 100 of FIG. 1. In some examples, the flowchart of FIG. 12 and/or the flowchart of FIG. 13 may be representative of example hardware logic, machine readable instructions, hardware implemented state machines, and/or any combination thereof for implementing the example workstation 104, the example printer 106, the example conductive material applicator 116, the example energy source 108, the example controller 118 and/or, more generally, the example post-print treatment system 100 of FIG. 1. In this example, the machine readable instructions may be an executable program or portion of an executable program for execution by a computer processor such as the processor 1412 shown in the example processor platform 1400 discussed in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example programs are described with reference to the flowcharts illustrated in FIGS. 12-13, many other methods of implementing the example workstation 104, the example printer 106, the example conductive material applicator 116, the example energy source 108, the example controller 118 and/or, more generally, the example post-print treatment system 100 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned herein, the example processes of FIGS. 12-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The method 1200 of FIG. 12 begins by obtaining the 3D printed object 102 via the workstation 104 and/or the printer 106 (block 1202). For example, the workstation 104 and/or the printer 106 forms the 3D printed object 102. In some examples, the post-print treatment system 100 obtains or retrieves the 3D printed object 102 from the workstation 104 and/or the printer 106. In some examples, the 3D printed object 102 includes a surface roughness that reflects light away from an outer surface 112 of the 3D printed object to provide a translucent or semi-opaque characteristic. In some examples, a surface roughness of the outer surface 112 of the 3D printed object 102 is generated during formation of the 3D printed object 102. For example, the surface roughness of the outer surface 112 may be generated due to excess powder particles adhered to the outer surface 112 when forming the 3D printed object 102 via MJF technology. In some examples, the 3D printed object 102 is constructed or manufactured via additive manufacturing processes and/or other 3D printing techniques. In some examples, a surface roughness of the outer surface 112 of the 3D printed object 102 may be increased after formation of the 3D printed object 102 (e.g., via secondary manufacturing processes).

The controller 118 determines a pattern representative of the surface feature 110 to be generated on the outer surface 112 of the 3D printed object 102 (block 1204). For example, a pattern representative of the surface feature 110 can include one or more of the patterns 408, 508, 602, 702 to be formed on the outer surface 112 of the 3D printed object 102. To form the surface feature 110, the controller 118 may receive instructions representative of the patterns 408, 508, 602, 702 to be formed on the outer surface 112 of the 3D printed object 102. The controller 118 may move or position the energy source 108 (e.g., a precision laser) relative to the outer surface 112 to form the pattern 408, 508, 602, 702.

After the pattern 408, 508, 602, 702 is determined, the energy source 108 applies energy to the select portion 114 of the outer surface 112 to alter or change a surface finish of the selected portion 114 and form the pattern 408, 508, 602, 702 representative of the surface feature 110 (block 1206). In some examples, the surface finish of the processed portion 114, 302, 402, 502, 606, 706 of the 3D printed object 102 can be altered. For example, formation of the 3D printed object 102 via the workstation 104 and the printer 106 causes the surface finish of the 3D printed object 102 to include the layer 206 of the excess adhered powder particles 202. To alter the processed portion 114, 302, 402, 502, 606, 706 of the 3D printed object 102, the energy source 108 applies energy to reduce a surface roughness of the processed portion 114, 302, 402, 502, 606, 706 compared to a surface roughness of a non-processed portion 115, 304, 406, 506, 608, 708 of the outer surface 112. For example, the energy source 108 may include a laser to apply heat to the processed portion 114, 302, 402, 502, 606, 706 to cause a polymer on the selected portion 114 of the outer surface 112 of the 3D printed object 102 to melt and reflow to reduce the surface roughness of the selected portion 114. As a result, the processed portion 114, 302, 402, 502, 606, 706 of the outer surface 112 processed by the energy source 108 has a surface roughness that is less than a surface roughness of the non-processed portion 115, 304, 406, 506, 608, 708 of the outer surface 112 that is not processed by the energy source 108. A contrast defined by the different surface roughness of the outer surface 112 defines the pattern 408, 508, 602, 702. For example, the processed portion 114, 302, 402, 502, 606, 706 may include a reduced amount (e.g., or elimination) of excess adhered powder particles 202 and the non-processed portion 115, 304, 406, 506, 608, 708 of the outer surface 112 includes a greater amount of excess adhered powder particles 202 to provide a contrast defining the pattern 408, 508, 602, 702 on the outer surface 112. In some examples, the controller 118 varies or changes at least one of a power input or a speed input of the energy source 108 to change a characteristic (e.g., a gray-scale characteristic) of the pattern 408, 508, 602, 702.

Referring to FIG. 13, the method 1300 includes obtaining the 3D printed object via the workstation 104 and/or the printer 106 (block 1302). In some examples, the 3D printed object 102 includes a surface roughness that reflects light away from an outer surface 112 of the 3D printed object to provide a translucent or semi-opaque characteristic. In some examples, the 3D printed object 102 can be constructed or manufactured via an MJF printer. In some examples, the 3D printed object 102 is constructed or manufactured via additive manufacturing processes and/or other 3D printing techniques. In some examples, a surface roughness of the outer surface 112 of the 3D printed object 102 may be increased after formation of the 3D printed object. In some examples, a surface roughness of the outer surface 112 of the 3D printed object 102 is generated during formation of the 3D printed object 102. For example, the surface roughness of the outer surface 112 may be generated due to excess powder particles adhered to the outer surface 112 when forming the 3D printed object 102 via MJF technology. In some examples, obtaining the 3D printed object 102 includes forming the 3D printed object 102 via the workstation 104 and/or the printer 106. In some examples, the outer surface 112 of the 3D printed object 102 may have a surface roughness that is negligible (e.g., almost completely smooth).

After the workstation 104 and/or the printer 106 forms the 3D printed object 102, the conductive material applicator 116 applies the conductive material 802 to at least the portion 114 of the outer surface 112 of the 3D printed object 102 (block 1304). For example, the controller 118 can control the conductive material applicator 116 to apply the conductive material 802 on the 3D printed object 102. In some examples, the controller 118 can cause the conductive material applicator 116 to apply the conductive material 802 at specific locations (e.g., the selected portion 114) of the outer surface 112. In some examples, the conductive material applicator 116 paints the conductive material 802 on the outer surface 112. In some examples, the conductive material applicator 116 submerges the 3D printed object 102 in the conductive material 802.

The controller 118 determines the pattern 900, 1105 representative of a conductive feature 110, 1102 to be generated on the outer surface 112, 1104 of the 3D printed object 102 (block 1306). For example, the pattern 900 may define the circuit 1000 defined by the conductive features 902 that can include resistors, capacitors, traces, and other electronic components. To form the surface feature 110, 1102, the controller 118 may receive instructions representative of the pattern 900, 1105 to be formed on the outer surface 112, 1104 of the 3D printed object 102. The controller 118 may move or position the energy source 108 (e.g., a precision laser) relative to the outer surface 112, 1104 to form the pattern 900, 1105

The energy source 108 applies heat to sinter the processed portion 804 of the outer surface 112 to form the pattern 900, 1105 representative of the conductive feature 110, 902 (block 1308). For example, the controller 118 controls or moves the energy source 108 (e.g., a precision laser) along a path relative to the outer surface 112 representative of the pattern 900, 1105. In some examples, the energy source 108 may sinter the select portion 804 while the conductive material 802 is wet. In some examples, the energy source 108 may sinter the select portion 804 while the conductive material 802 is dry. In some examples, the controller 118 varies or changes at least one of a power input or a speed of the energy source 108 to vary a resistance characteristic of a resistor 1102.

Figure 14:
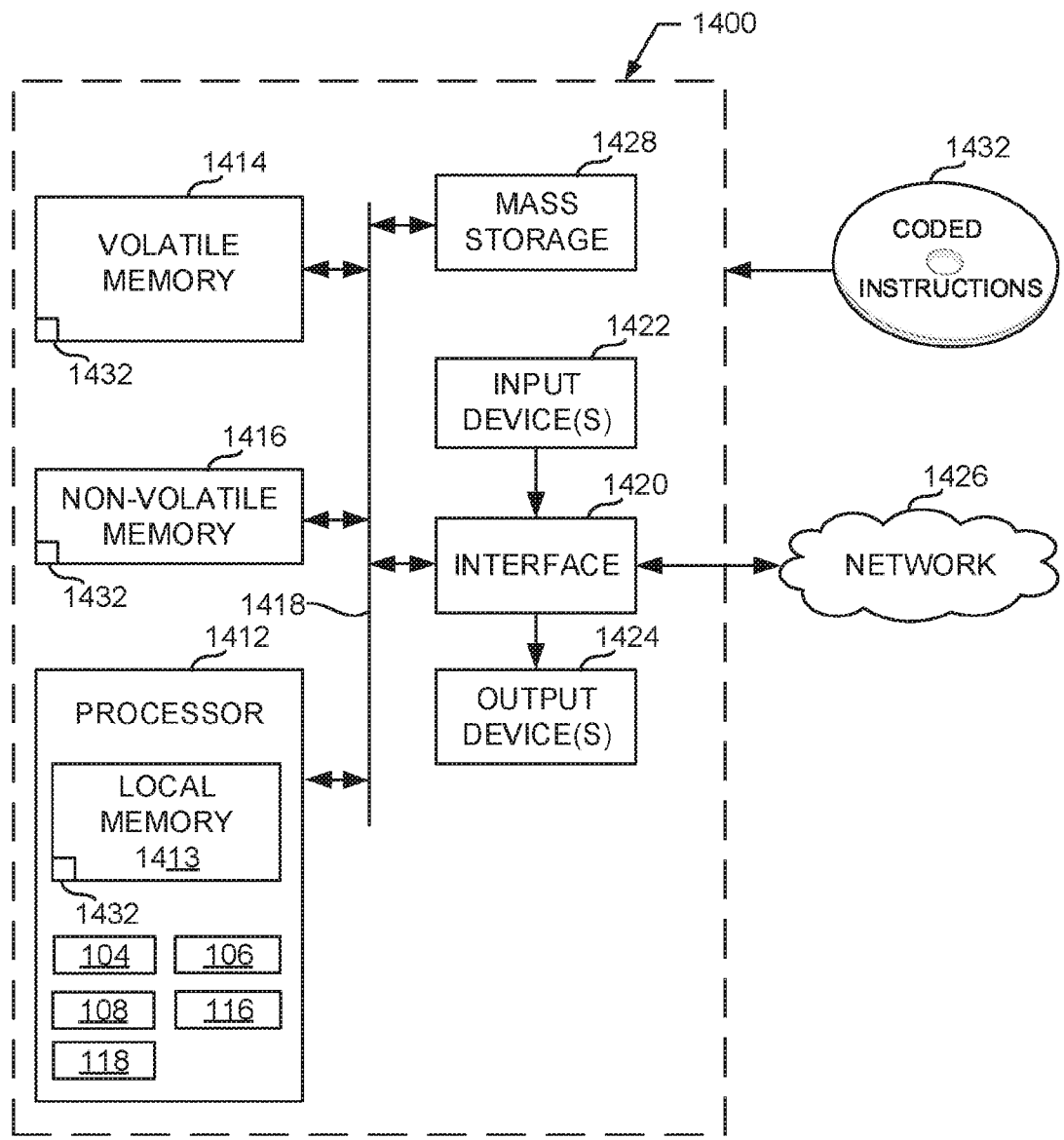
FIG. 14 is a block diagram of an example processing platform structured to execute instructions to implement the example post-print treatment system of FIG. 1.

FIG. 14 is a block diagram of an example processor platform 1400 structured to execute the instructions of the example processes of FIGS. 12 and 13 to implement the example workstation 104, the example printer 106, the example conductive material applicator 116, the example energy source 108, the example controller 118 and/or, more generally, the example post-print treatment system 100 of FIG. 1. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements one or more aspects of the example workstation 104, the example printer 106, the example conductive material applicator 116, the example energy source 108, the example controller 118 and/or, more generally, the example post-print treatment system 100 of FIG. 1.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 12-13 may be stored in the mass storage device 1428, in the volatile memory 1414, in the non-volatile memory 1416, and/or on a removable non-transitory computer readable storage medium such as a CD or DVD.

From the foregoing, it will be appreciated that the disclosed methods, apparatus and articles of provide post-print treatment of a 3D printed object or product with an energy source (e.g., a laser) to create desirable features on the surface of the 3D parts. In some examples, a laser-writer can be employed to treat post-printed 3D products. The laser-writer selectively reflows a polymer on a selected portion of a surface of a 3D printed part to at least one of create a relatively high gloss feature, a visually aesthetic design on the 3D printed part, a tracking feature, and/or any other feature(s). Differential amounts of melting can allow for gray-scale features (e.g., between as-printed color, low gloss and black with high gloss).

Also, in some examples, the laser-writer selectively sinters metal nanoparticle fluids that are placed on an outer surface of the 3D printed part to create conductive features on the 3D printed part. The features include, for example, conductive circuitry, an RF tag, an antenna, etc. Differential amounts of sintering can allow for differential conductivity (for making high conductivity traces or resistors). In this manner, 3D printed parts can be created using polymers that do not include conductive materials. For example, conventional 3D printing techniques employ unique polymer blends with catalysts embedded within the resin to produce conductive elements on 3D printed objects. Such unique polymer blends greatly have limited applicability because the unique polymer blends are not conducive to MJF technology. Polymer powders for MJF fusion, on the other hand, are generally black and/or amorphous polymers.

At least some of the aforementioned examples include at least one feature and/or benefit including, but not limited to, the following:

In some examples, a system includes an energy source to apply energy to a selected portion of an outer surface of a 3D printed object. The energy provided by the energy source is to cause a polymer of the selected portion to melt and reflow. The selected portion and a non-selected portion of the outer surface to form a pattern on the outer surface of the 3D printed object. A controller to direct the energy of the energy source to the selected portion of the outer surface.

In some examples, the energy source is a precision laser.

In some examples, the energy provided by the energy source is to reduce a surface roughness of selected portion to a value that is less than a surface roughness of the non-selected portion.

In some examples, the system includes a multi-jet fusion printer to form the 3D printed object.

In some examples, a method includes obtaining a three dimensional (3D) printed object. In some examples, the method includes determining a pattern representative of a surface feature to be generated on an outer surface of the 3D printed object. In some such examples, the method includes altering a surface finish of a select portion of the outer surface by causing a reflow of polymer on the select portion to form the pattern representative of the surface feature.

In some examples, the altering of the surface finish includes reducing a surface roughness of the outer surface without altering an outer layer of a main body of the 3D printed object.

In some examples, the altering of the surface finish includes applying energy to the select portion of the outer surface.

In some examples, applying the energy includes applying heat to the select portion of the outer surface via a laser.

In some examples, the method includes varying at least one of a speed or a power intensity of the laser to vary a gray-scale characteristic of the select portion of the outer surface.

In some examples, the obtaining the 3D printed object includes forming the 3D printed object via multi-jet fusion.

In some examples, the polymer on the outer surface includes excess adhered powder particles, and wherein the altering of the surface finish includes applying energy, via a laser, to the select portion of the outer surface based on the pattern, the energy to cause reflow of a first portion of the excess adhered powder particles on the select portion, a non-selected portion of the outer surface not processed by the energy including a second portion of the excess adhered powder particles, the select portion and a non-selected portion to provide a contrast defining the pattern.

In some examples, the reflow of the first portion of the excess adhered powder particles is to cause a reduction in a surface roughness of the select portion of the outer surface.

In some examples, a method includes forming a three-dimensional (3D) printed object from a polymer that does not include a conductive material. In some examples, after formation of the 3D printed object, applying a conductive material on at least a portion of an outer surface of the 3D printed object. In some examples, determining a pattern representative of a conductive feature to be generated on an outer surface of the 3D printed object. In some examples, sintering a select portion of the outer surface of the 3D printed object to form the pattern representative of the conductive feature.

In some examples, the sintering of the select portion includes applying heat to the select portion of the outer surface via a laser.

In some examples, the conductive feature includes a resistor, and further including varying at least one of a power input or a speed of the laser to vary a resistance characteristic of the resistor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A method comprising:
    obtaining a three dimensional (3D) printed object;
    determining a pattern representative of a surface feature to be generated on an outer surface of the 3D printed object; and
    altering a surface finish of a select portion of the outer surface by causing a reflow of polymer on the select portion to form the pattern representative of the surface feature, wherein the altering of the surface finish includes reducing a surface roughness of the outer surface without altering an outer layer of a main body of the 3D printed object, wherein the altering of the surface finish includes:
    applying heat to the select portion of the outer surface via a laser; and
    varying at least one of a speed or a power intensity of the laser to vary a gray-scale characteristic of the select portion of the outer surface.

2. The method of claim 1, wherein obtaining the 3D printed object includes forming the 3D printed object via multi jet fusion.

3. The method of claim 1, wherein the polymer on the outer surface includes excess adhered powder particles, wherein the heat applied by the laser is to cause reflow of a first portion of the excess adhered powder particles on the select portion.

4. The method of claim 3, wherein a non-selected portion of the outer surface not processed by the laser includes a second portion of the excess adhered powder particles, the select portion and a non-selected portion to provide a contrast defining the pattern.

5. The method of claim 4, wherein the reflow of the first portion of the excess adhered powder particles is to cause a reduction in the surface roughness of the select portion of the outer surface.

6. A method comprising:
    obtaining a three dimensional (3D) printed object;
    determining a pattern representative of a surface feature to be generated on an outer surface of the 3D printed object after formation of the 3D printed object; and
    altering a surface finish of a selected portion of the outer surface after the 3D printed object is formed by causing a reflow of polymer on the selected portion to form the pattern representative of the surface feature, wherein the altering of the surface finish includes reducing a surface roughness of the selected portion of the outer surface relative to a non-selected portion of the outer surface of a main body of the 3D printed object adjacent the selected portion.

7. The method of claim 6, further including forming the pattern without altering the outer surface of the non-selected portion of the 3D printed object.

8. The method of claim 6, wherein the altering of the surface finish includes applying energy to the selected portion of the outer surface.

9. The method of claim 8, further including using a precision laser to provide the energy.

10. The method of claim 8, wherein applying the energy includes applying heat to the selected portion of the outer surface via a laser.

11. The method of claim 10, wherein the altering of the surface finish of the select portion of the outer surface includes applying the laser to an outermost, finished surface of the 3D printed object.

12. The method of claim 6, wherein the selected portion and the non-selected portion of the outer surface provide a contrast forming the pattern on the outer surface of the 3D printed object.

13. The method of claim 6, wherein the surface roughness of the selected portion is to have a value that is less than a surface roughness of the non-selected portion.

14. The method of claim 6, further including forming the 3D printed object via a multi-jet fusion printer.

15. The method of claim 6, wherein obtaining the 3D printed object includes forming the 3D printed object via multi jet fusion.

16. A method comprising:
    obtaining a three dimensional (3D) printed object;
    determining a pattern representative of a surface feature to be generated on an outer surface of the 3D printed object after formation of the 3D printed object; and
    altering a surface finish of a select portion of the outer surface after the 3D printed object is formed by causing a reflow of polymer on the select portion to form the pattern representative of the surface feature, wherein the polymer on the outer surface includes excess adhered powder particles, and wherein the altering of the surface finish includes applying energy, via a laser, to the select portion of the outer surface based on the pattern, the energy to cause reflow of a first portion of the excess adhered powder particles on the select portion, a non-selected portion of the outer surface not processed by the energy including a second portion of the excess adhered powder particles, the select portion and a non-selected portion to provide a contrast defining the pattern.

17. The method of claim 16, wherein the reflow of the first portion of the excess adhered powder particles is to cause a reduction in a surface roughness of the select portion of the outer surface.

18. A method comprising:
    forming a three-dimensional (3D) printed object from a polymer that does not include a conductive material;
    after formation of the 3D printed object, applying a conductive material on at least a portion of an outer surface of the 3D printed object;
    determining a pattern representative of a conductive feature to be generated on an outer surface of the 3D printed object; and
    sintering a select portion of the outer surface of the 3D printed object to form the pattern representative of the conductive feature.

19. The method of claim 18, wherein the sintering of the select portion includes applying heat to the select portion of the outer surface via a laser.

20. The method of claim 18, wherein the conductive feature includes a resistor, and further including varying at least one of a power input or a speed of a laser to vary a resistance characteristic of the resistor.

* * * * *